United States Patent [19]
de Vaan et al.

[11] Patent Number: 5,184,248

[45] Date of Patent: Feb. 2, 1993

[54] IMAGE PROJECTION APPARATUS

[75] Inventors: Adrianus J. S. M. de Vaan; Adrianus H. J. van den Brandt, both of Eindhoven, Netherlands

[73] Assignee: U.S. Philips Corporation, New York, N.Y.

[21] Appl. No.: 764,667

[22] Filed: Sep. 24, 1991

Related U.S. Application Data

[63] Continuation-in-part of Ser. No. 665,507, Mar. 6, 1991.

[30] Foreign Application Priority Data

Jul. 16, 1990 [NL] Netherlands ............... 9001610

[51] Int. Cl.$^5$ ............... G02B 5/30; G02B 27/28
[52] U.S. Cl. ................... 359/483; 359/496
[58] Field of Search ........... 359/483, 494, 495, 496; 353/33, 34, 81, 82

[56] References Cited

U.S. PATENT DOCUMENTS

| | | | |
|---|---|---|---|
| 3,612,652 | 10/1971 | Habeggar | 359/496 |
| 3,998,524 | 12/1976 | Hubby et al. | 359/496 |
| 4,127,322 | 11/1978 | Jacobson | 353/31 |
| 4,239,346 | 12/1980 | Lloyd | 350/334 |
| 4,722,593 | 2/1988 | Shimazaki | 350/336 |

*Primary Examiner*—John D. Lee
*Assistant Examiner*—Robert E. Wise
*Attorney, Agent, or Firm*—Norman N. Spain

[57] ABSTRACT

An image projection apparatus is described, which comprises an illumination system (100, 101, 54, 57, 62) having a first, round lens plate (54) and a second, half-round lens plate (57). A combination of a special polarization-sensitive beam splitter (20) and a polarization rotator (31) is arranged in the path of the beam supplied by this system and converts the beam into two sub-beams having the same state of polarization which jointly illuminate a display panel (1) in a uniform manner and optimally fill the surface area of this panel and a subsequent projection lens system (C).

62 Claims, 10 Drawing Sheets

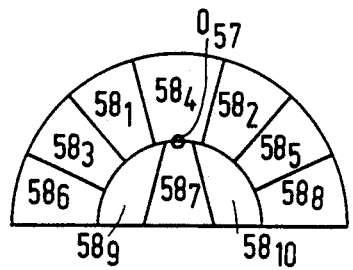
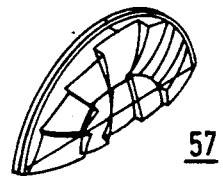
FIG. 9　　　　　FIG. 10
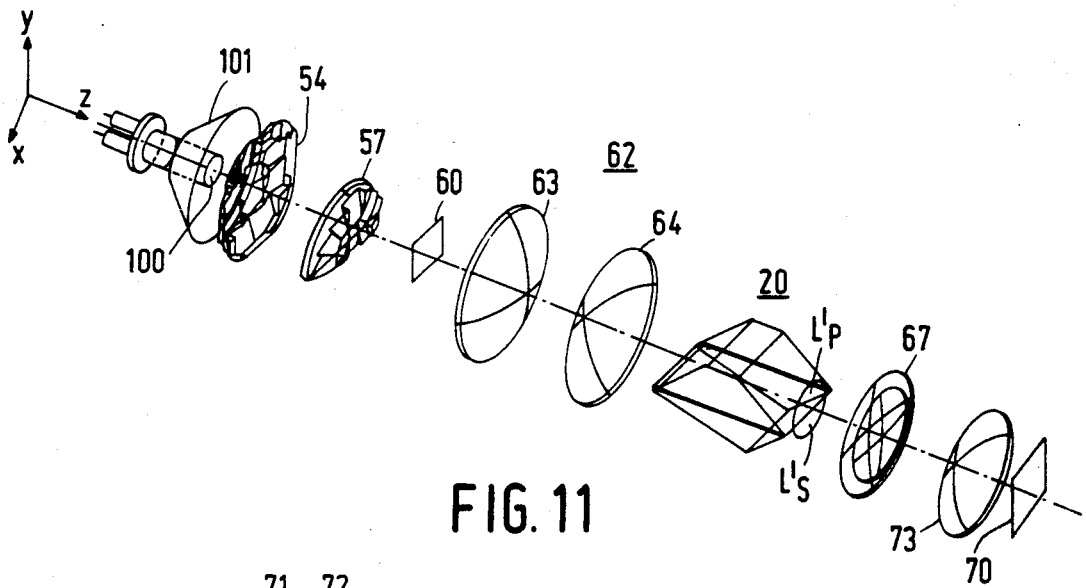
FIG. 11
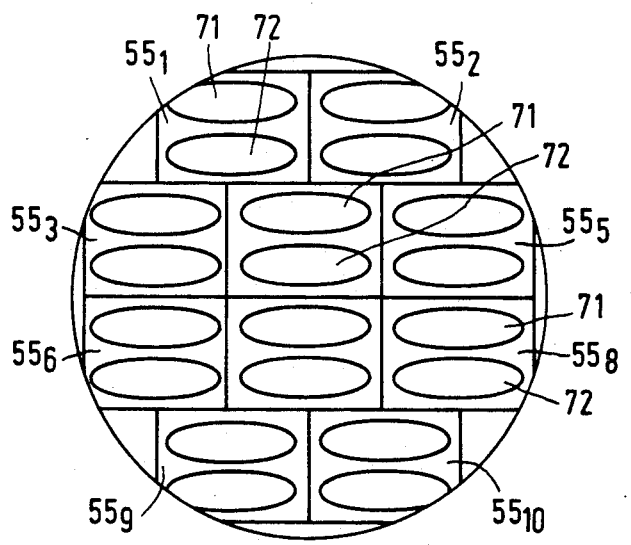
FIG. 12

IMAGE PROJECTION APPARATUS

This application is a continuation-in-part of application Ser. No. 07/665,507, filed Mar. 6, 1991.

BACKGROUND OF THE INVENTION

The invention relates to an image projection apparatus comprising an illumination system, an image display system having at least one display panel for generating an image to be projected, in which the direction of polarization of an illumination beam supplied by the illumination system is modulated with the image information, a projection lens system for projecting the image formed by the image display system on a projection screen and a polarization-sensitive beam splitter arranged between the illumination system and the image display system for splitting the illumination beam into two differently polarized sub-beams the first of which is directly suitable to be modulated by the image display system and a polarization-rotating element for converting the second sub-beam into a beam having the same state of polarization as the first sub-beam, said first and second sub-beams being incident on the image display system.

The term image projection apparatus should be understood in a wide sense and comprises a device for displaying, for example, a video image, a graphic image, numerical information or a combination thereof. The images may be both monochrome and colour images. In the latter case the display system may comprise three colour channels for, for example, the primary colours red, green and blue, each channel comprising a display panel.

Such an image projection apparatus for a colour image is described in German Patent Application No. 3,829,598. The display panels of the known apparatus are reflective panels having a layer of liquid crystalline material of the so-called nematic type as an active, or image-forming element. This layer changes the direction of polarization of an incident beam of light locally, in dependence upon the image information. To this end the light beam must be polarized linearly in a given direction. The known apparatus comprises a polarization-sensitive beam splitter consisting of two prism portions between which a dielectric interference layer is provided. This layer splits the illumination beam into two mutually perpendicular linearly polarized sub-beams a first of which is passed on to the image display system. To make efficient use of the available light, a λ/4 plate, in which λ is the wavelength of the light, is arranged in a diagonal position in the path of the second sub-beam reflected by the interference layer. A reflector reflecting the second sub-beam towards the interference layer is present behind this λ/4 plate. Since the second sub-beam has traversed the λ/4 plate twice, its direction of polarization is rotated through 90° with respect to the original direction so that the second sub-beam is also passed on to the image display system. Two sub-beams then exit from the polarization-sensitive beam splitter, which sub-beams are located on both sides of a plane through the principal axis of the apparatus. The principal axis of this apparatus is the line which connects the centre of the radiation source in the illumination system to the centre of the image display system.

Since the operation of the interference filter used as a polarization beam splitter is dependent on the wavelength of the radiation and on the angle at which the rays are incident on this filter, this filter is less suitable because the illumination beam has a larger aperture angle and a wavelength range which comprises the entire visible light spectrum. Moreover, the optical path lengths through the beam splitter are different for the two sub-beams so that the two images of the radiation source formed by these sub-beams are located at different positions along the principal axis. The known apparatus does not have any provisions to achieve that the cross-section of the illumination beam at the location of a display panel corresponds to that of the panel and at the location of the projection lens system corresponds to the aperture of this lens system.

SUMMARY OF THE INVENTION

The present invention has for its object to provide an image projection apparatus which does not have the above-mentioned combination of drawbacks. According to the invention the apparatus is characterized in that the polarization-sensitive beam splitter comprises an oriented layer of birefringent material, in that the illumination beam directed towards the beam splitter has a semi-circular cross-section in a plane proximate to the beam splitter, in that the sub-beams traverse the same optical path length through the beam splitter and in that the sub-beams exiting from the combination of beam splitter and polarization-rotating element have a semi-circular cross-section and both fit within a circle.

The apparatus is preferably constructed in such a way that, in the absence of the beam splitter, the illumination beam has a semi-circular cross-section in a plane behind the location of the beam splitter. The sub-beams formed by the beam splitter then jointly constitute substantially one beam having a round cross-section. This cross-section is adapted to the round pupil of the projection lens system so that the diameter of this system can remain limited.

The apparatus may alternatively be constructed in such a way that the illumination beam has a semi-circular cross-section in a plane at the entrance of the beam splitter. The sub-beams exiting from the beam splitter then also have a semi-circular cross-section, but are further spaced apart so that the circumscribed circle is larger.

There are two classes of embodiments of the polarization-sensitive beam splitter according to the invention.

The embodiments of the first class are characterized in that the beam splitter comprises a first prism having a first face which is parallel to the chief ray of the illumination beam incident on the beam splitter and a second prism having a first face which is parallel to the chief ray, which prisms have the same refractive index, in that the layer of birefringent material is located between the first faces of the prisms, while one of the refractive indices of this material is substantially equal to that of the prisms, in that a second and a third face of the first prism, which faces extend at equally large but opposite angles to the first face, constitute the entrance face and a first exit face, respectively, of the beam splitter, and in that a second face of the second prism, which face is parallel to the second face of the first prism, constitutes a second exit face of the beam splitter.

The embodiments of the first class are preferably further characterized in that the polarization-rotating element is arranged on one of the exit faces of the beam splitter.

A first embodiment of the first class is characterized in that the birefringent material is a liquid crystalline material.

A second preferred embodiment of the first class is characterized in that the layer of birefringent material is a birefringent adhesive layer.

As compared with a layer of liquid crystalline material, the birefringent adhesive layer has the advantages that it is less temperature-dependent and better resistant to temperatures. Moreover, the refractive indices of the adhesive layer of the prisms can be better adapted to each other when a birefringent adhesive layer is used.

The adhesive layer is preferably a uniaxially oriented polymer layer.

A beam splitter which is particularly resistant to temperatures is characterized in that the polymer layer is formed from a cured liquid crystalline monomer composition.

An embodiment of the second class is characterized in that the beam splitter comprises a layer of cholesteric material arranged at an angle of approximately 45° to the principal axis, which layer splits the illumination beam into a first, reflected sub-beam of circularly polarized light having a first direction of rotation and into a second, on-going sub-beam of circularly polarized light having a second, opposite direction of rotation, and is further provided with a first reflector arranged in the path of the first sub-beam and being parallel to the chief ray of the illumination beam incident on the beam splitter and with a second reflector arranged in the path of the second sub-beam at an angle of approximately 90° to the cholesteric layer, and in that one of the reflectors reverses the direction of rotation of the sub-beam incident thereon.

This beam splitter supplies two sub-beams both of which are left or right-circularly polarized and jointly constitute a beam having a round cross-section. This beam can be supplied to the image display system without conversion of polarization. However, alternatively the circularly polarized beam may first be converted into a linearly polarized beam before it reaches the image display system.

It is to be noted that the use of a layer of (levorotatory or dextrorotatory) cholesteric material in combination with a reflector to enable the two polarization components of an illumination beam to be used in an image projection apparatus is known per se from the article "Novel Polarized Liquid Crystal Color Projection and New TN-LCD Operating Modes" in Digest of Technical Papers vol. XXI Symposium of Society for Information Displays, Las Vegas (Nev.) May 15-17, 1990. This article does not say which shape the incoming illumination beam should have, nor does it say that the sub-beams from the beam splitter should have a cross-section which is adapted to the projection lens system.

Another important aspect of the present invention relates to the method in which the illumination system, which comprises a radiation source, a concave reflector for concentrating light from the source and a lens system arranged in the path of the concentrated light, is adapted in such a way that this system supplies an illumination beam which has a semi-circular cross-section in a plane behind and in the vicinity of the beam splitter and which has a uniform light distribution at the location of a display panel and a cross-section which is adapted to that of the panel. To achieve this, the illumination system according to the invention is characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centres of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

Since the width/height ratio of the lenses of the first lens plate is equal to that of the display panel, the cross-section of the illumination beam incident on this panel and being built up from sub-beams each originating from a pair of conjugated lenses of the first and second lens plate, can be rendered equal to the active surface of the panel so that the available light is utilized to a maximum extent. Since the light spots formed on the lenses of the first lens plate are imaged in a superimposed form by the second lenses, the intermediate image and the image formed on the panel have a uniform light distribution.

It is to be noted that a projection apparatus is known from U.S. Pat. No. 3,296,923 in which two lens plates are arranged one behind the other between a radiation source and a lens having a large numerical aperture so as to achieve that the beam incident on the object to be projected has a uniform light distribution and a cross-section which is equal to the surface of the object. However, in the known apparatus the second lens plate does not have a semi-circular shape. Moreover, this apparatus does not comprise a polarization-sensitive beam splitter with a polarization rotator and the object in this apparatus is not illuminated with light of a specific state of polarization.

The illumination system may be further characterized in that at least one of the lenses of at least one of the lens plates is aspherical.

An aspherical lens is understood to means a lens whose fundamental shape is spherical but whose real shape has small deviations from the fundamental shape to correct for the spherical aberrations of the fundamental shape. The imaging quality can be improved by using aspherical lenses in a lens plate.

The illumination system is perferably further characterized in that the number of first lenses is equal to the number of second lenses.

This is the case if each one of the first lenses constitutes one smallest constriction on a conjugated second lens.

The illumination system is further preferably characterized in that the first lenses have such a size and are arranged in such a way that the surface of the first lens plate is approximately equal to the cross-section of the illumination beam incident thereon.

A maximum quantity of the light emitted by the source is then captured.

The different embodiments of the illumination system can be divided into different classes, each class relating to a different aspect of the system. In the illumination system characteristic features of different classes may be combined.

A first class of embodiments relates to the positions of the source images in the illumination system. A first embodiment of this class is characterized in that the first lens plate is arranged in a plane in which a first image of the light source is formed and in that this image is reimaged in an intermediate image by the second lens plate.

A second embodiment of the first class is characterized in that a reduced image of the light source is formed on each one of the second lenses.

The light source is herein understood to mean both the light source itself and its image which is formed by the reflector or by other optical elements arranged in front of the lens plates, which image may coincide or not coincide with the source.

The second class of embodiments relates to the possibilities of integrating different lens elements. An embodiment of the second class is characterized in that the first lens plate, together with an associated lens, is integrated in one optical element having at least one curved surface.

Said "associated" lens which was arranged in front of the lens plate in the original design of the illumination system, now constitutes a support for the first lenses so that a separate support is no longer required, thus giving the illumination system a simpler construction and making it easier to assemble.

If said lens is a planoconvex lens, this embodiment may be further characterized in that the first lenses are arranged on the flat refractive surface of the lens.

Alternatively, this embodiment may be further characterized in that the first lenses are arranged on a curved refractive surface of the lens.

As a further alternative, this embodiment may be characterized in that a curved refractive surface of the lens is replaced by a principally flat surface on which the first lenses are arranged each having a curvature which is related to the curvature, at the location of the relevant lens, of the original curved refractive surface.

A third class of embodiments of the illumination system relates to the design of the part of this system in front of the first lens plate. A first embodiment of this class is characterized in that the reflector is a spherical reflector which only collects light emitted by the source at one side of the plane through the centre of the radiation source and perpendicular to the optical axis of the system, and in that a condensor lens system is arranged at the other side of this plane and in front of the first lens plate.

An alternative embodiment is characterized in that the reflector is an aspherical reflector which only collects light emitted by the source at one side of the plane through the centre of the radiation source and perpendicular to the principal axis, and in that two condensor lens systems are arranged at the other side of this plane and in front of the first lens plate, each system capturing a different part of the light originating from the source and the reflector.

In the case of an equal light-collective power a double condensor lens system, as compared with a single condensor lens system, has the advantage that it has a lower throughput so that the image projection apparatus may comprise less expensive optical elements having, for example, smaller numerical apertures or smaller cross-sections, which is particularly important in apparatuses for consumer use. The term "throughput", or "luminosity" or "acceptance" characterizes the power of an optical system to transport light energy. This power is determined by the combination of an aperture, or "stop", and the pupil at one and the same position in the optical system and can be expressed by the product of the surface of the aperture and the spatial angle subtended by the pupil in the centre of the aperture. In an optical system which has a given throughput at the beginning, the throughput further down the system can only be diminished by blocking radiation.

It is to be noted that it is generally known, for example, from U.S. Pat. No. 4,722,593 to use a reflector at the one side of a radiation source and a condensor lens system at the other side of this source in a projection apparatus with a liquid crystal display panel. However, the known apparatuses are not provided with lens plates. Moreover, in the apparatus according to this U.S. Patent the reflector, which is not further specified, is arranged around the radiation source so that this reflector also receives source radiation which is emitted beyond an angle of 180°.

The condensor lens system must have a large numerical aperture so that a maximum possible quantity of light is captured. In principle, this lens system may comprise one lens element. The first embodiment of the third class, comprising a single condensor lens, is preferably further characterized in that at least one refractive surface of the condensor lens is aspherical.

The first embodiment of the third class may alternatively be further characterized in that each condensor lens system comprises a main condensor lens which is succeeded by at least one extra lens element.

The extra lens elements may take over a part of the required correction or of the lens power of the main condensor lens so that this lens is easier to manufacture and may be less expensive. The extra lens elements may also be used for improving the imaging quality. If a part of the power of the condensor lens system is incorporated in the extra lens elements, these elements may be aspherical. The extra lens elements may alternatively be, for example, Fresnel lenses which have the advantage that they are light and thin.

The illumination system comprising two condensor lens systems may be further characterized in that the first lens plate is divided into two first lens plates which are arranged in the first and the second condensor lens system, respectively.

The length of the illumination system can be reduced by accommodating the first lens plate in the condensor lens system.

Apart from an illumination system comprising an aspherical reflector and a condensor lens system, the present invention may alternatively be applied to great advantage in other embodiments in which other elements are used for concentrating the source radiation. A second embodiment of the third class is characterized in that the reflector is a parabolic reflector which surrounds the greater part of the light source.

A parabolic reflector has of itself the advantage that it captures a large portion of the source light. However, the light beam formed by this reflector has an inhomogeneous distribution of the illumination intensity. It is true that a more homogeneous distribution can be obtained by arranging the light source outside the focal point of the parabola, but then the beam has a large angular aperture so that the projection lens system must have a large numerical aperture. The illumination intensity distribution can be made more homogeneous by using said lens plates in an illumination system with a parabolic reflector.

Since for each image formed on the lenses of the second lens plate the light originates from a different portion of the parabolic reflector, all of which portions have a different orientation with respect to the light source, all of said images have a different orientation with respect to the lens plate. This can be satisfactorily combined with the fact that the second lenses, which are arranged within half a circle, have an orientation which is mutually different and which is different with respect to the first lenses.

The remarks made hereinbefore with reference to the second embodiment of the third class also apply to a third embodiment of this class. This embodiment is characterized in that the reflector is an elliptic reflector which surrounds the greater part of the light source.

This third embodiment may be further characterized in that a collimator lens is arranged between the reflector and the first lens plate.

A fourth embodiment of the third class is characterized in that the reflector is a hyperbolic reflector.

This embodiment may also be further characterized in that a collimator lens is arranged between the reflector and the first lens plate.

If the embodiments of the third class are provided with an elongate light source, these embodiments are preferably further characterized in that the longitudinal direction of the light source is parallel to the principal axis.

The invention also relates to a colour image projection apparatus having three colour channels for the three primary colours red, green and blue, each colour channel comprising a separate display panel. According to the invention this apparatus is characterized in that it comprises one image projection apparatus as described hereinbefore for supplying separate beams for the three colour channels via colour-splitting means.

The colour image projection apparatus may be alternatively characterized in that each colour channel comprises a separate image projection apparatus as described hereinbefore.

BRIEF DESCRIPTION OF THE DRAWINGS

Embodiments of the invention will now be described in greater detail with reference to the accompanying drawings, in which:

FIGS. 9 and 10 show the second lens plate used in this apparatus in a perspective front view and rear view, respectively, FIG. 11 shows a second embodiment of the image projection apparatus in a perspective view, FIG. 12 shows the first lens plate with the light source images formed thereon in a rear view.

DETAILED DESCRIPTION OF THE INVENTION

Figure 1:
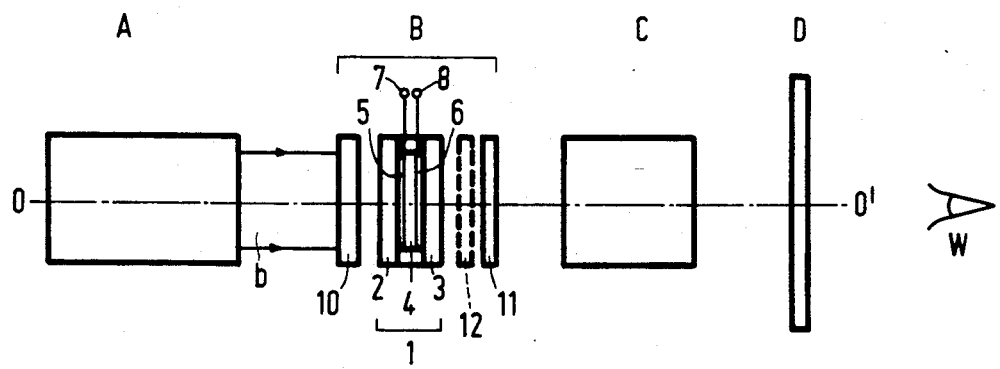
FIG. 1 shows the diagram of an image projection apparatus.

In FIG. 1 the block A represents an illumination system which emits a light beam b whose chief ray coincides with the optical axis OO' of the image projection apparatus. This beam is incident on the image display system B which has one display panel 1 if a monochromatic image must be projected. This panel is, for example, a liquid crystal display panel (LCD). Such a panel comprises a layer of liquid crystalline material 4, for example, of the nematic type which is enclosed between two transparent plates 2 and 3 of, for example glass. Drive electrodes 5 and 6 are arranged on each plate. These electrodes may be divided into a large number of rows and columns so that a large number of pixels in the display panel is defined. The different pixels are then driven by driving the matrix electrodes, as is shown diagrammatically by means of the drive terminals 7 and 8. Thus, an electric field can be applied across the liquid crystalline material 4 at the desired positions. Such an electric field causes a change of the effective refractive index of the material 4 so that the light passing through a given pixel undergoes or does not undergo a rotation of the direction of polarization, dependent on the absence or presence of a local electric field at the location of the relevant pixel.

Instead of this so-called passive-drive display panel, it is also possible to use an active-drive panel. In the last-mentioned display panel one of the supporting plates has one electrode while the semiconductor drive electronics are arranged on the other plate. Each pixel is now driven by its own active-drive element such as, for example a thin film transistor. Both types of direct-drive display panels are described in, for example, European Patent Application no. 0,266,184.

The beam incident on the display panel 1 must be polarized, preferably linearly polarized. However, the illumination system A produces unpolarized light. Of this light a linearly polarized component having the desired direction of polarization is selected by means of a polarizer 10. An analyser 11, whose direction of polarization is, for example effectively parallel to that of the polarizer 10, is arranged in the path of the light passed by the display panel. As a result the light originating from those pixels which are energized and which do not change the direction of polarization of the beam will be passed by the analyser to a projection lens system C. The light originating from the non-energized pixels, which rotate the direction of polarization of the beam through 90°, is blocked by the analyser. The analyser thus converts the polarization modulation of the beam into an intensity modulation. The projection lens system C projects the image formed on the panel 1 on a projection screen D. This projected image can be viewed by a spectator W who is present in the room behind the projection screen.

In the above-described embodiment the pixels across which no electric field is applied are imaged as black dots on the projection screen D. It is alternatively possible to drive a pixel in such a way, i.e. to apply such a field strength across this pixel that the direction of polarization of the incident linearly polarized light is not rotated through 90°, but this linearly polarized light is converted into elliptically polarized light. A portion of this light is passed towards the projection screen and the rest is blocked. The relevant beam element is then not imaged as a black or white element on the projection screen but as a grey element, whose greyness is adjustable.

Instead of linearly polarized light, an image projection apparatus with liquid crystal display panels can in principle also use circularly or elliptically polarized light. The display panel can then change the direction of rotation of the circularly polarized light or the ratio of the elliptical axes of the elliptically polarized light. Said changes can be converted into an intensity modulation by means of extra polarization means.

If an image display system is used whose pixels in the driven state rotate the direction of polarization and do not rotate this direction in the non-driven state, an additional layer of liquid crystalline material rotating the direction of polarization of the complete beam through 90° may be arranged in series with the display panel 11, so that the image on the projection screen has the same polarity as the image which is formed in an apparatus with a display panel whose pixels in the driven state do not rotate the direction of polarization.

Such an additional polarization rotator, which is denoted by reference numeral 12 in FIG. 1, may also be used if an arrangement in which the pixels in the driven state do not rotate the direction of polarization these pixels are still to appear as black pixels on the projection screen. This provides the possibility of camouflaging, for example, unwanted effects in the display panel, of obtaining an increased contrast, of decreasing the colour dependence of the apparatus or of raising the switching speed of the display panel.

Instead of a layer of liquid crystalline material a $\lambda/2$ plate, in which $\lambda$ is the wavelength of the projected light, can be used as an additional polarization rotator 12. As a further alternative the analyser may be rotated 90° with respect to the original orientation.

When used in transmission, a liquid crystal display panel has a low efficiency, for example only 10% of the radiation incident on the panel is passed to the projection lens system. Moreover, this system images the panel in a magnified form so that the illumination beam should have a large intensity if there is still to be sufficient radiation intensity per unit of surface area on the screen. The use of a light source in the form of a lamp having a higher intensity provides only limited improvements. In fact, lamps having a higher light intensity generally also have a larger radiating surface area in the form of a lamp arc so that the output aperture of the illumination system will be larger. When reducing the beam aperture so as to limit the dimensions of the subsequent optical components in the projection apparatus, a part of the light energy would be lost again. It is therefore desirable to receive as much light as possible from the lamp and to concentrate it to a narrow beam. A further requirement is that the cross-section of this beam should be adapted to a maximum possible extent to the rectangular shape of the display panel so that a minimum possible quantity of light falls beyond this panel.

A number of measures has been taken to meet these requirements in the apparatus according to the invention. Firstly, the two polarization components of the source light are used to illuminate the display panel. To this end use is made of a combination of a special polarization-sensitive beam splitter and a polarization converter. Secondly, it has been ensured that the light beam incident on the beam splitter has a specific cross-section and is incident on the beam splitter in a special manner.

Figure 2:
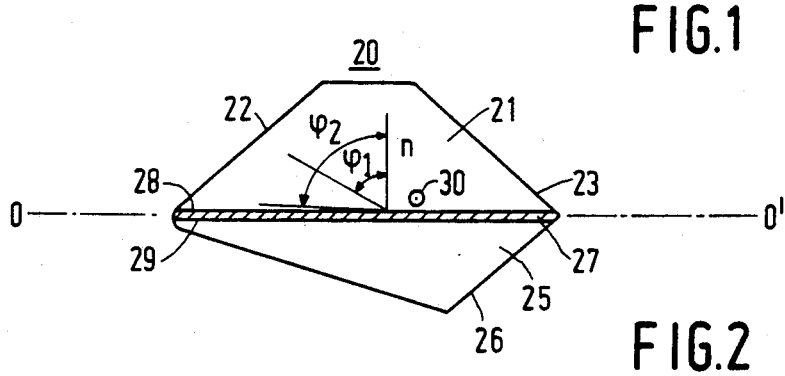
FIG. 2 shows a first embodiment of a beam splitter for use in an apparatus according to the invention.

FIG. 2 shows the polarization-sensitive beam splitter in a cross-section. This beam splitter 20 comprises two prisms 21 and 25 of, for example, glass and a birefringent layer 27. This layer consists of, for example a liquid crystalline material. The ordinary refractive index $n_o$ is substantially always equal to 1.5, while the extraordinary refractive index $n_e$ may have a value of between 1.6 and 1.8, dependent on the composition of the layer 27. The prisms are provided with so-called orientation layers 28 and 29 which ensure that the optical axis of the layer 27 is perpendicular to the plane of the drawing in this case. This axis is denoted by reference numeral 30 in FIG. 2. It has been ensured that the refractive index $n_1$ of the prism material is equal to $n_e$ of the layer 27, for example, 1.7. If a non-polarized light beam is incident on the layer 27 via the prism 21 at an angle of incidence $\phi$ which is larger than or equal to the critical angle, the P-polarized component of this beam undergoes a total reflection to the exit face 23 of the prism 21 because the ordinary refractive index of the layer 27 holds for this component, which index is smaller than that of the prism 21. The P-polarized component is the component whose direction of polarization is parallel to the plane of incidence, i.e. the plane through the normal n on the layer 27 and transverse to the plane of the drawing. The extraordinary refractive index of the layer 27 holds for the S-polarized component whose direction of polarization is transverse to the plane of incidence, so that this component does not meet any difference in refractive index when it passes through the beam splitter and subsequently traverses the prism 21, the layer 27 and the prism 25 into the original direction.

The critical angle $\phi_1$ for the P component is given by $$\sin\phi_1 = \frac{n_0}{n_1}, \text{ or: } \phi_1 = \arcsin\frac{n_0}{n_1}.$$

so that it must hold for the angle of incidence $\phi$ that:

$$\phi > \arcsin\frac{n_0}{n_1}$$

if the P component is to be reflected completely. Even if the extraordinary refractive index $n_e$ of the layer 27 is not equal to $n_1$ of the prism material, the S component is passed on completely as long as the angle of incidence $\phi$ is smaller than the critical angle $\phi_2$ for which it holds that:

$$\sin\phi_2 = \frac{n_e}{n_1}, \text{ or: } \phi_2 = \arcsin\frac{n_e}{n_1}.$$

The complete condition for the angle of incidence $\phi$ for obtaining the division by the layer 27 thus is:

$$(\phi_1=)\arcsin\frac{n_0}{n_1} < \phi < \arcsin\frac{n_e}{n_1} (=\phi_2).$$

The angle $\phi_1$ and $\phi_2$ are shown in FIG. 2.

The difference $\Delta n = n_e - n_o$ in refractive index of liquid crystalline material may be large so that the beam splitter 20 is suitable for a large range ($\phi_2-\phi_1$) of angles of incidence $\phi$. Moreover, it can be ensured that the refractive index of the prism material and that of the layer 27 vary in the same way when the wavelength of the incident light beam is changed so that the beam splitter has a large polarization-splitting efficiency for a large wavelength range. A very great advantage of the beam splitter according to FIG. 2 is that it is inexpensive because it does not require any expensive birefringent prism materials, as in a Wollaston prism and because this prism can be made relatively easily.

The prisms 21 and 25 need not be solid; it is alternatively possible for these prisms to consist of glass or other transparent walls within which a transparent liquid or synthetic material having a high refractive index equal to $n_e$ of the layer 27 is provided. These walls should have the same refractive index as the liquid or synthetic material, which materials should not have any depolarizing effects.

Instead of a liquid crystalline layer a birefringent adhesive layer is preferably used as a polarization-separating layer in the beam splitter according to FIG. 2. As compared with a beam splitter having a liquid crystalline layer, a beam splitter having a birefringent adhesive layer has the advantages that it has a simpler construction, its operation is less temperature-dependent, it is better resistant to higher temperatures and there are more possibilities to adapt the refractive indices of the layer and the prisms to each other.

The birefringent adhesive layer is preferably a uniaxially oriented polymer layer. The desired orientation can be obtained, for example, by rubbing the prism surfaces between which the layer must be provided in one direction, while it is efficient when the surfaces to be rubbed are provided with a layer of polyimide.

A beam splitter which is particularly resistant to temperatures is a splitter in which the polymer layer is formed from a cured liquid crystalline monomer composition.

Figure 3:
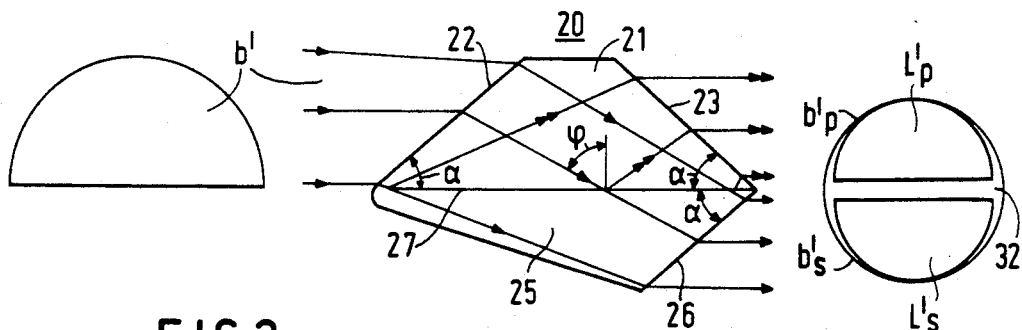
FIG. 3 shows the operation of this beam splitter.

FIG. 3 shows how an illumination beam b' incident on the beam splitter 20 is split by this beam splitter into two linearly mutually perpendicularly polarized beam components $b'_p$ and $b'_s$. Only the chief ray and the two border rays entering the prism 21 through the face 22 are shown of the illumination beam b'. This face is arranged at an angle $\alpha$ to the bounding layer 27 so that after refraction by this face the angle of incidence $\phi$ of the beam on the layer 27 has a value between the above-mentioned critical angles $\phi_1$ and $\phi_2$ so that the P-polarized beam component $b'_p$ is completely reflected and leaves the prism 21 via the exit face 23. The S-polarized component enters the prism 25 and leaves this prism via the exit face 26. The exit faces 23 and 26 are also arranged at an angle $\alpha$ to the bounding layer 27 so that the beam components $b'_p$ and $b'_s$ have effectively traversed a plane-parallel plate and, after refraction on the faces 23 and 26, respectively, are thus parallel to the incident beam b'.

As will be further described the illumination system arranged in front of the beam splitter is adapted in such a manner that the beam b' has a semi-circular cross-section and is located at one side of the layer 27 as is shown in the left-hand part of FIG. 3. The exiting beam components $b'_p$ and $b'_s$ then also have a semi-circular cross-section but are located at different sides of the principal axis within a circle 32, as is shown in the right-hand part of FIG. 3. The illumination system is further adapted in such a manner that in the absence of the beam splitter one image of the source is formed at a position behind the beam splitter. When providing the beam splitter two source images $L'_p$ and $L'_s$ are then produced, in which $L'_p$ is the source image formed with P-polarized light, while $L'_s$ is the source image formed with S-polarized light.

Figure 4:
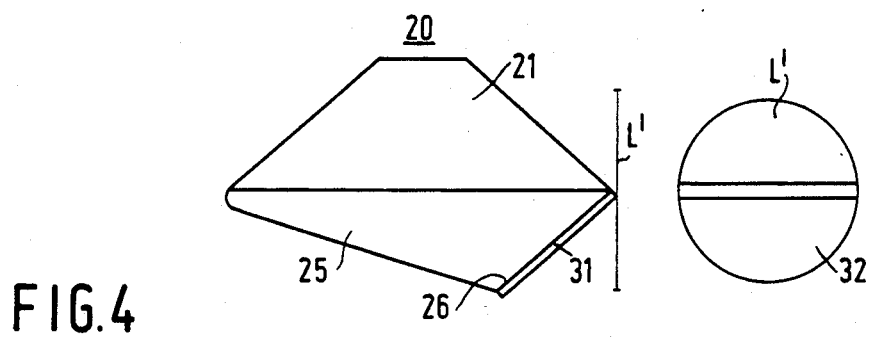
FIG. 4 shows this beam splitter with a polarization rotator on one of the exit faces.

If a $\lambda/2$ plate 31 is arranged on one of the exit faces, for example, the face 26, as is shown in FIG. 4, the direction of polarization of the component $b'_s$ is rotated over 90° so that the beam exiting from the plate 31 is also P-polarized. The two source images then jointly constitute one secondary source L' which emits linearly polarized light which is suitable for illuminating the panel 1 of FIG. 1.

Instead of a $\lambda/2$ plate a layer of rotated liquid crystalline material, for example, a polymer or a number of uniaxial birefringent layers which are mutually rotated can be used as a polarization rotator 31. The polarization rotator may not only be arranged on an exit face, 23 or 26, but also behind such an exit face.

Figure 5:
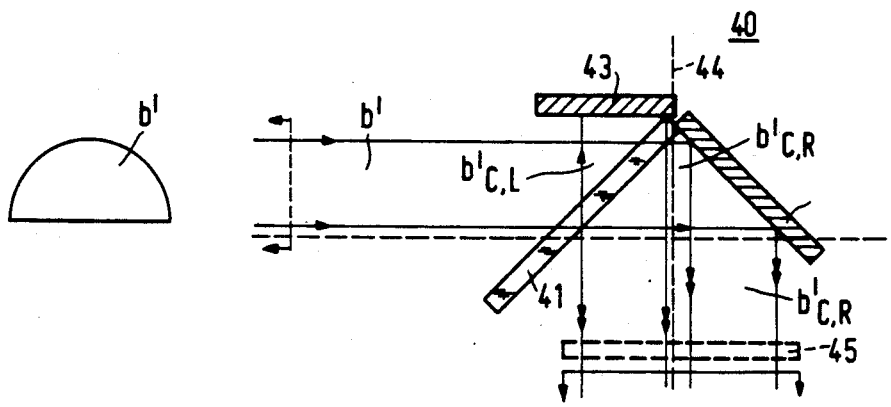
FIG. 5 shows a second embodiment of a beam splitter.
Figure 5:
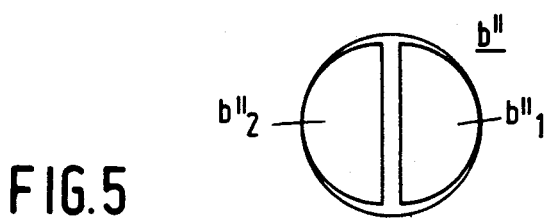

FIG. 5 shows a second embodiment of a beam splitter. The polarization-sensitive separating layer 41 of this beam splitter 40 comprises a cholesteric liquid crystalline material. This material may be of the levorotatory or dextrorotatory type. If the material is of the levorotatory type, the component of the entering non-polarized beam b' which is levocircularly polarized, $b'_{c,L}$, is reflected, whereas the dextrocircularly polarized component $b'_{c,R}$ is passed. The component $b'_{c,R}$ is reflected to the image display system (not shown) by a special reflector 42. This reflector does not change the state of polarization of the component $b'_{c,R}$ and consists of, for example, a dextrorotatory liquid crystalline material. The reflected component $b'_{c,L}$ is incident on a reflector 43, for example, a normal mirror which converts the levocircularly polarized light into dextrocircularly polarized light which is passed by the layer 41 and has the same direction as the component $b'_{c,R}$. Thus the beam $b'$ having a semi-circular cross-section is converted into two beam components $b''_1$ and $b''_2$, both having a semi-circular cross-section and with dextrocircularly polarized light which jointly constitute a beam $b''$ having a round cross-section, as is shown in the bottom part of FIG. 5.

When the beam splitter according to FIG. 5 is used, the illumination system may be adapted in such a manner that an image of the source is formed in the face 44.

The beam with dextrocircularly polarized light may be applied to a display panel without any conversion of polarization. This has the advantage that the field with which the panel, for example, of the nematic type must be driven is smaller than in the case of using linearly polarized radiation. Alternatively, a $\lambda/4$ plate 45 may be arranged in a diagonal position behind the beam splitter 40, which plate converts the circularly polarized light into linearly polarized light.

Instead of a levorotatory cholesteric layer, a dextrorotatory cholesteric layer can be used as a separating layer 41, in which case the reflector 42 may consist of a levorotatory material and the reflector 43 is a normal mirror again. The light exiting from the beam splitter 40 is then levocircularly polarized.

By using the polarization-sensitive beam splitter in combination with a polarization converter, as described hereinbefore, optimum use of the radiation of the source is made as far as polarization is concerned. Moreover, since the beam exiting from the beam splitter has a circular cross-section, this beam is optimally adapted to the round aperture of the projection lens system, C in FIG. 1. According to the invention a special illumination system is used which is provided with, inter alia, two lens plates for obtaining a beam $b'$ with a semi-circular cross-section at the entrance of the beam splitter, which beam further has a rectangular cross-section at the location of a display panel, which cross-section is adapted to the shape of the panel and also has a satisfactorily uniform light distribution.

Figure 6:
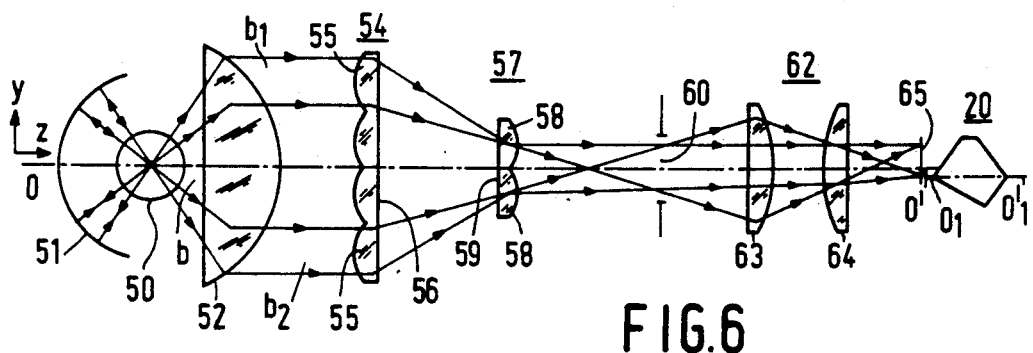
FIG. 6 shows a first embodiment of the image projection apparatus in a cross-section.
Figure 7:
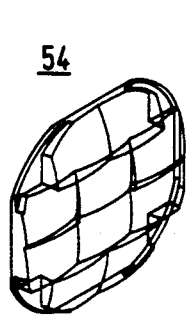
FIGS. 7 and 8 show the first lens plate used in this apparatus in a perspective front view and rear view, respectively.
Figure 8:
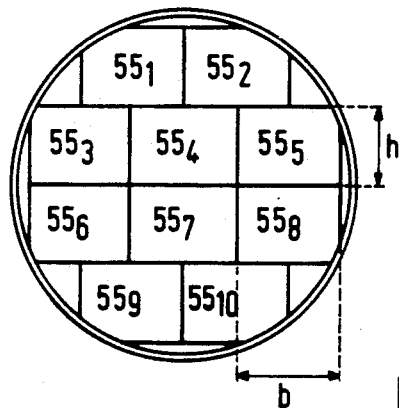

FIG. 6 shows diagrammatically a first embodiment of this illumination system. This system comprises a lamp 50 which emits light in the direction of the display panel 1 as well as in the rearward direction (at the left in FIG. 6). A spherical reflector 51 receiving the rearwardly emitted light and forming an image of this lamp is arranged at the rear side of the lamp. In FIG. 6 the lamp image formed by the reflector 51 coincides with this lamp. It has been assumed that the lamp is transparent to its own light. This will often not be the case in practice. In that case it is ensured that the lamp image is situated beside the lamp. The light emitted by the lamp and its image are received by a condensor lens system 52 which concentrates this light to a parallel beam, in other words, it images the lamp to infinity. The parallel beam is incident on a first lens plate 54. The side of this plate facing the source is provided with a plurality of lenses 55 and the other side 56 is preferably flat. FIG. 7 shows this plate in a perspective front view, while FIG. 8 shows the plate in a rear view.

The cross-section of the plate 54 in FIG. 6 only shows four lenses. Actually, the plate 54 comprises, for example 10 lenses, as is shown in FIGS. 7 and 8. Each of these lenses images the source 50 on an associated lens 58 of the second lens plate 57. The source-facing side 59 of this plate, which is shown in a front view in FIG. 9 and in a perspective rear view in FIG. 10, is flat, while the side remote from the source supports a plurality of lenses 58. The number of lenses 58 of the plate 57 is equal to the number of lenses 55 of the plate 54, or is twice this number if, for example, the reflector 51 forms a lamp image beside the lamp. To image the light source 50 on the different lenses $58_1 \ldots 58_{10}$ by means of the corresponding lenses $55_1 \ldots 55_{10}$, a different portion of the beam b incident on the plate 54 is used each time. For the sake of clarity, FIG. 6 only shows two sub-beams $b_1$ and $b_2$.

The lenses $55_1 \ldots 55_{10}$ have such a power in such a direction that the sub-beams passing through them have their smallest constriction in the plane of the lenses 58, while their chief rays are directed towards the centres of the corresponding lenses $58_1 \ldots 58_{10}$. The lenses $58_1 \ldots 58_{10}$ have such a power in such a direction that they image the radiation spots formed on the lens plate 54 in a superimposed form in an intermediate image 60. It is thereby achieved that the illumination beam has a satisfactorily uniform distribution at this image, which distribution is maintained further down the apparatus. A source image having a semi-circular cross-section is produced at the location of the lens plate 57. The intermediate image 60 is an image of the lenses $55_1 \ldots 55_{10}$ and thus has a shape which corresponds to that of these lenses.

A lens system 62 comprising, for example, two plano-convex lenses 63 and 64 is arranged behind the intermediate image 60. This lens system images the intermediate image 60 to infinity, while it forms an image 65 of the lens plate 57 at the location of the beam splitter, for example, the prism 20.

As is shown in FIG. 6, the apparatus has a first and a second principal axis. The first principal axis $00'$ extends as far as the beam splitter 20 and passes through the centre of the lamp 50 and the centre of the second lens plate 57 denoted by $O_{57}$ in FIG. 9. The second principal axis $0_1 0_1'$ extends from the beam splitter through the beam-separating layer 27 as far as the projection lens system and is perpendicular to the display panel.

FIG. 11 shows the portion of the apparatus once more with the elements described above, but this time in a perspective view. Instead of a spherical reflector and a condensor lens system, a parabolic reflector 101 for concentrating the light from an elongate source 100 is used. FIG. 11 shows that a further lens 67 is arranged behind the polarization-sensitive beam splitter 20. An image 70 of the intermediate image 60, i.e. a superimposed final image of the lenses $55_1 \ldots 55_{10}$ is produced in the focal plane of this lens. This final image is not influenced by the polarization-sensitive beam splitter 20 because the beam producing the image of the lenses $55_1 \ldots 55_{10}$ is a parallel beam at the location of this beam splitter and because the entrance and exit faces of this beam splitter are parallel faces for this beam.

The display panel 1 is arranged in the focal plane of the lens 67 so that the final image 70 is formed on this panel.

The liquid crystal display panels which are used when displaying conventional video images have an aspect ratio $b:h = 4:3$, the width b being the dimension in the X direction, perpendicular to the plane of the drawing in FIG. 6, and the height h being the dimension in the Y direction in the plane of the drawing of FIG. 6 and perpendicular to the optical axis $00'$. In the embodiment of FIGS. 7 and 8 the lenses 55 of the plate 54 have the same aspect ratio. As a result all radiation coming from the condensor lens system 52 passes through the display panel and the illumnation system has a high collection efficiency.

The display panel and the lenses 55 may alternatively have a different aspect ratio, for example, 16:9.

FIG. 12 is a rear view of the first lens plate 54 with the images of the radiation source formed on teh lenses 55. By way of example it has been assumed that the reflector 51 images the radiation source beside itself for the greater part so that two source images 71 and 72 are formed on each lens 55. All these source images have the same orientation. As a result of this and due to a correct choice of the dimensions of the radiation source and its image formed by the reflector 51, which dimensions are determined by the position of the reflector 51, the surface area of each lens $55_1 \ldots 55_{10}$ can be substantially fully utilized. The lenses $55_1 \ldots 55_{10}$ are preferably arranged in such a manner that their joint outer circumference approximates a circle as much as possible. Since the effective surface area of the lens plate 54 is optimally adapted to the cross-section of the beam $b_1$ supplied by the reflector, a maximum quantity of the source light is captured.

As is shown in FIG. 11, a field lens 73 may be arranged in the radiation path of the illumination beam, which lens images the exit pupil of the illumination system, formed by the radiation source images $L'_p$ and $L'_s$ in this case, in the exit pupil of the projection lens system (6 in FIG. 1). Since the source images $L'_p$ and $L'_s$ jointly constitute a round surface and are optimally adapted to the round aperture of the projection lens system, the size of this system and the further optical elements may remain limited.

The size of the lenses 55 is determined by the desired size of the diagonal of the beam cross-section at the area of the display panel 1 and by the magnification of the optical system formed by all elements between the first lens plate 54 and the display panel.

Figure 13:
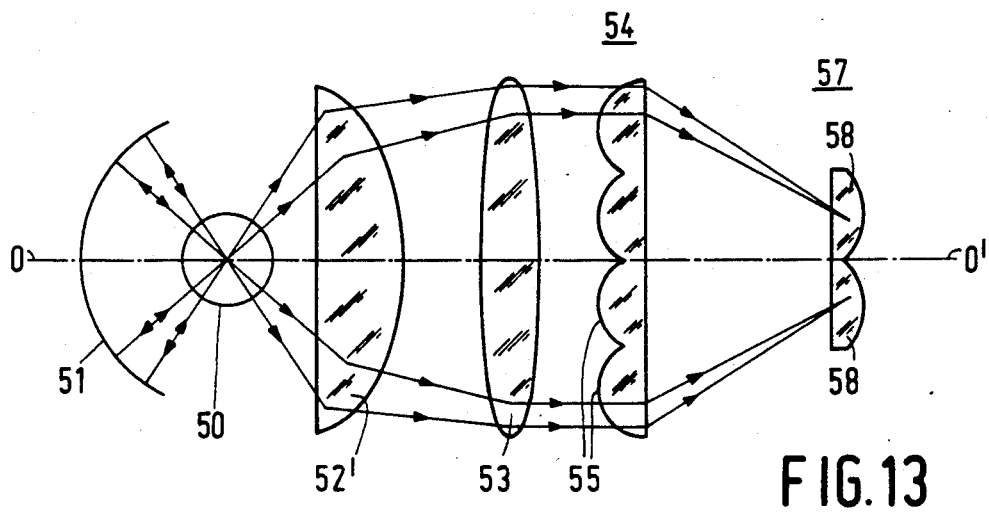
FIGS. 13, 14, 15 and 16 show different embodiments of the illumination system with a spherical reflector behind the light source.

The condensor lens system must have a large numerical aperture, for example, of the order of 0.85 so as to enable it to collect sufficient radiation from the source. As is shown in FIG. 6, the condensor lens system may be in the form of a single, thick lens element 52. In order that the imaging errors remain limited, this lens element should have at least one aspherical surface. The requirements imposed on the lens element 52 can be alleviated if one or more additional lens elements 53 are added to this lens element 52', as is shown in FIG. 13. The additional lens elements may supply a part of the required correction of the lens element 52' and may be, for example, aspherical. It is alternatively possible for a part of the required power of the condensor lens system to be built into the additional lens elements. The additional elements may not only be elements having curved refractive surfaces but also light and thin Fresnel lens elements or lens elements having a radially varying refractive index.

Figure 14:
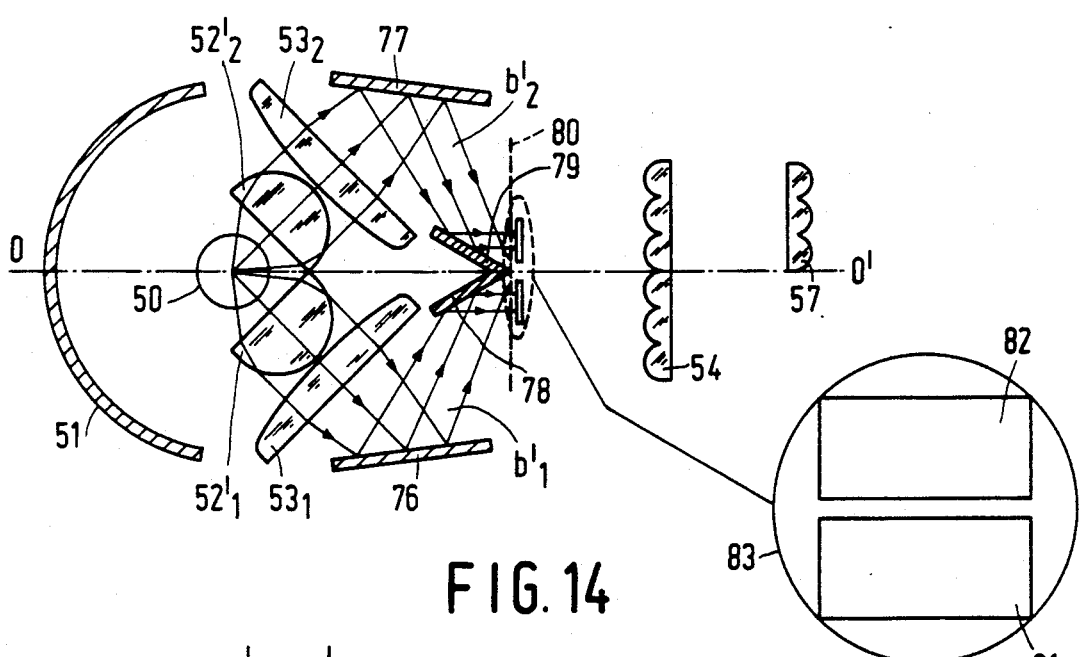

Instead of a single condensor lens system the illumination system may also comprise a double condensor lens system, as is shown in FIG. 14. In this illumination system two condensor lens systems $52'_1$, $53_1$ and $52'_2$ and $53_2$, respectively, are arranged at the front side of the radiation source 50. This radiation source is, for example an elongate metal halide lamp having a length-width ratio of, for example, 2:1. As in FIGS. 6 and 13, the longitudinal direction of the lamp is perpendicular to the optical axis 00'. The radiation collected by the condensor lens systems is concentrated in two sub-beams $b'_1$ and $b'_2$ which are reflected to the optical axis 00' by reflectors 76 and 77. Two reflectors 78 and 79, which constitute a roof mirror, are arranged on both sides of the optical axis at a position where the principal axes of the beams $b'_1$, $b'_2$ would intersect each other and where the beam cross-sections are small. These reflectors deflect the beams $b'_1$, $b'_2$ towards the optical 00'. The smallest constrictions of these beams are in a plane 80. In this plane two secondary radiation sources having small radiating surfaces may be assumed to be arranged.

The inset of FIG. 14 shows these radiation sources, or lamp images 81, 82 in a front elevation. The dimensions of these images, reckoned back to the position of the lamp are equal to those of the lamp. The radius of the circle 83 within which the images 81 and 82 are located is smaller than twice the radius of the circumscribed circle of the radiation source so that the radiation of the source 50 is concentrated to a beam having a small cross-section by the double condensor lens system. Moreover, the angular apertures of the beams $b'_1$, $b'_2$ with which the images 81 and 82 are formed are relatively small. This means that the double condensor lens system has a large light-collective power, combined with a low throughput. The term throughput, or luminosity or acceptance characterizes the power of an optical system to transport radiation energy. This power is determined by the combination of an aperture, or "stop" and the pupil at one and the same position in the optical system and can be expressed by the product of the surface of the aperture and the spatial angle subtended by the pupil in the centre of the aperture. In an optical system which has a given throughput at the beginning, the throughput further down the system can only be diminished by blocking radiation.

Since the double condensor lens system has a lower throughput than a single condensor lens system, while maintaining the same light-collective power, in the image projection apparatus comprising a double condensor lens system less expensive optical elements having, for example, smaller numerical apertures or smaller cross-sections, can be used which is particularly important in apparatuses for consumer use.

A reflector 51 which reflects the radiation emitted from the rear side of the source to the condensor lenses $52'_1$, $52'_2$ is arranged behind the radiation source 50 also in the double condensor lens system, so that the intensity of the beams $b'_1$, $b'_2$ and hence the efficiency of the illumination system is increased.

FIG. 14 illustrates that the centre of the second lens plate 57 need not be located on the first principal axis 00', but this plate may altenatively be located entirely at one side of this axis.

Figure 15:
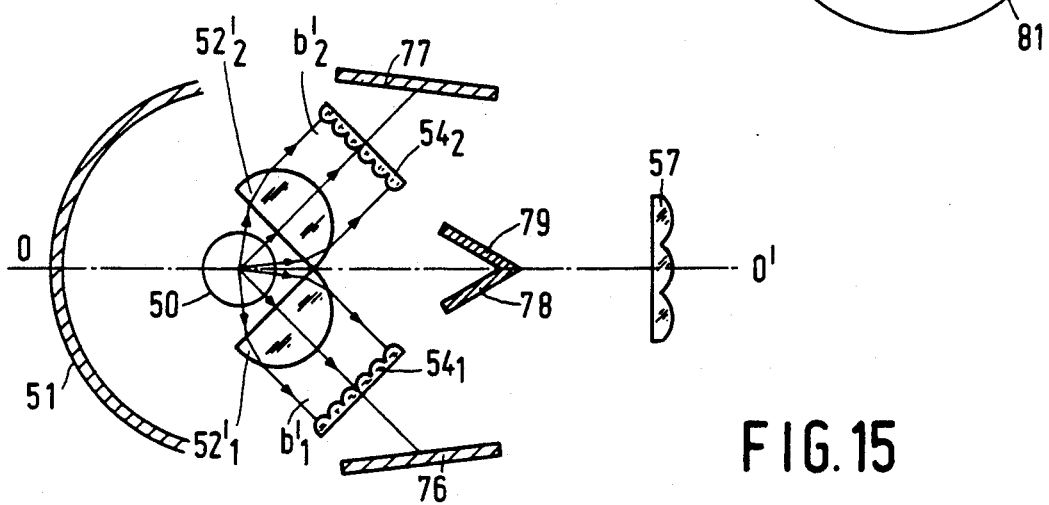

FIG. 15 shows an embodiment of the illumination system comprising a double condensor lens system in which two first lens plates $54_1$ and $54_2$ are used. These lens plates are arranged, for example, between the main condensor lenses $52'_1$ and $52'_2$ and the reflectors 76 and 77, respectively. The beams $b'_1$ and $b'_2$ have a rectangular cross-section at the area of these lenses so that the lenses 55 of these plates are preferably arranged in such a manner that the plates are also rectangular.

The lens plates $54_1$ and $54_2$ may also be arranged between the reflectors 76 and 78, and the reflectors 77 and 79, respectively.

The embodiment of FIG. 15 may also comprise extra condensor lens elements, analogous to the lens elements $53_1$ and $53_2$ of FIG. 14. However, it is alternatively possible to integrate these lens elements with the lens plates $54_1$ and $54_2$, in an analogous way as will be described with reference to FIGS. 17 and 18.

Since the radiation beam incident on the first lens plate 54 in the illumination system according to FIGS. 6 and 13 is a parallel beam, the surface area of the lenses of the plate 57 may be on average half that of the surface area of the lenses 55.

Figure 16:
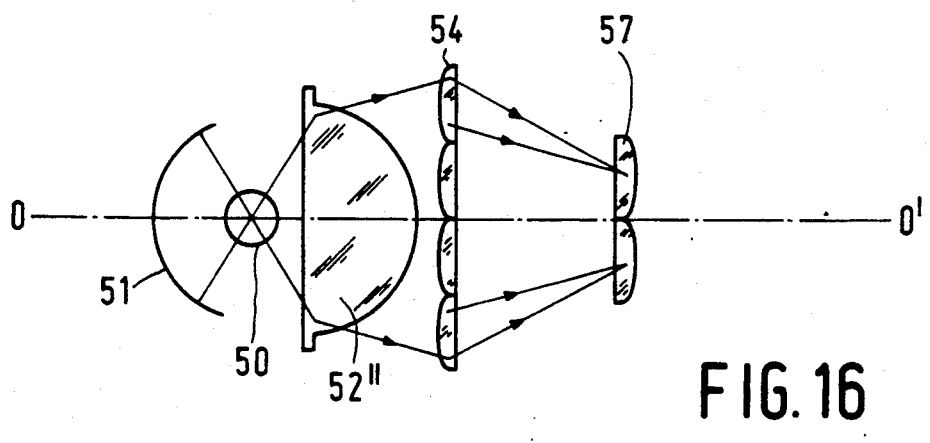

Under circumstances it may be desirable to alleviate the requirements imposed on the single condensor lens element 52 of FIG. 6. This is the case if the radiation beam from this element is a diverging beam instead of a parallel beam, as is shown in FIG. 16. The lenses of the second lens plate 57 must then be adapted. The power of the condensor lens 52" which is smaller as compared with that of the condensor lens 52 of FIG. 6 can be compensated for by adapting the lens system 62 of FIG. 6.

A similar arrangement as that shown in FIG. 15 is obtained if the condensor element 53 in the embodiment of FIG. 13 is arranged behind the second lens plate 57.

Figure 17:
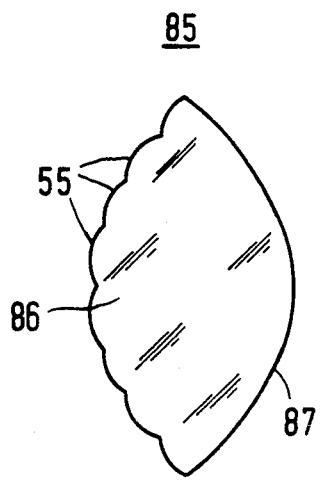
FIGS. 17 and 18 show two embodiments of an integrated first lens plate and lens.
Figure 18:
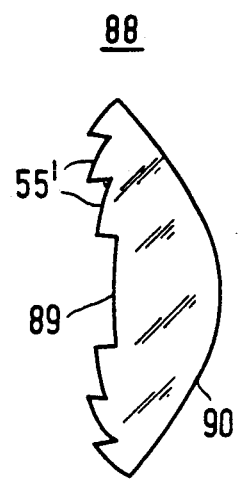

In the embodiment according to FIG. 13 the lens 53 and the lens plate 54 can be integrated in one element 85, as is shown in FIGS. 17 and 18, respectively. The lens then serves as a support for the lenses 55 so that the illumination system comprises one element less, which simplifies this system and makes it easier to assemble. In the embodiment of FIG. 17 the lenses 55 are arranged on the first curved surface 86 of the integrated element 85 having second surface 87. FIG. 18 shows an embodiment in which the lenses 55' are arranged on a principally flat surface 89 of the integrated lens 88 having second surface 90. The curved surface 86 of FIG. 17 is replaced in FIG. 18 by the different curvatures of lenses 55'. In principle the curvature of a lens 55' corresponds to that of the portion of the surface 86 in FIG. 17 at the location of this lens, but it is corrected for the fact that the sub-beam for this lens traverses a thinner lens and would therefore acquire a different direction.

As already noted, the illumination system according to the invention may supply a beam having a satisfactorily uniform distribution of its illumination intensity. However, the illumination intensity at the edge of the object to be illuminated need not be exactly equal in all cases to that in the centre of the object. Notably when displaying video images by means of a liquid crystal display panel the displayed image would look unnatural if the intensity were equal. It is then preferable for the illumination intensity to decrease to a slight extent from the centre towards the edges of the display panel.

Figure 19:
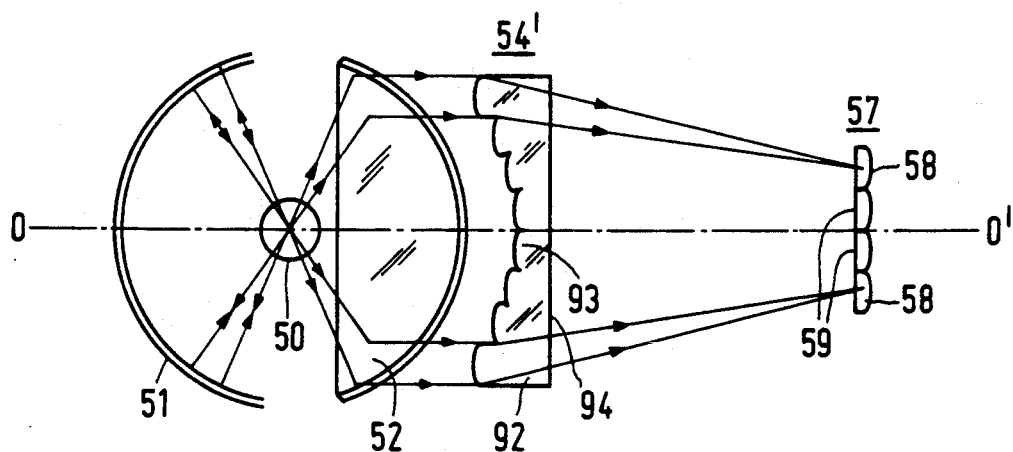
FIG. 19 shows an embodiment of the illumination system having a curved first lens plate.

FIG. 19 shows an embodiment of the illumination system in which this is realised. This embodiment comprises a first lens plate 54' having a transparent substrate 92 having a first surface 93 and a second surface 94, the first surface 93 of which is provided with a plurality of lenses 55. The surface 93 is curved so that the thickness of the substrate 92 in the centre is smaller than at the edge. It can be ensured that each beam portion originating each time from a lens pair 55, 58 is focused on the intermediate image. The magnification with which the radiation spots formed on the lenses 58 are imaged on the intermediate image 60 and ultimately on the display panel, which magnification D60/D58 is given by D60/D58=f58/f55, is different for the different lens pairs due to the different mutual distances between the lenses 55 and 58 of a pair. The focal length f58 is smallest for the central lenses 58 so that the images formed on the object by means of these lenses are larger than the images formed at the edge of the lens plate by means of the lenses 58.

The illumination system may also be adapted in such a way that beam portions coming from the different pairs of lenses are focused on different axial positions. The sub-beams originating from the lens pairs 55, 58 which are located against the optical axis 00' may be focused on the display panel 1. The beam portions originating from the lens pairs which are further and further remote from the axis 00' are more and more defocused in the plane of the intermediate image 60. A number of radiation spots having an increasing size and a decreasing illumination intensity per unit of surface area is now superimposed at the location of this image. This results in a total radiation spot having an illumination intensity decreasing from the centre.

Due to the finite number of lenses of the lens plates 54' and 57 the decrease in intensity in the plane of the panel 1 is step-wise. As from a given number of lenses 55 and 58 these steps will quickly become invisible to the viewer.

Figure 20:
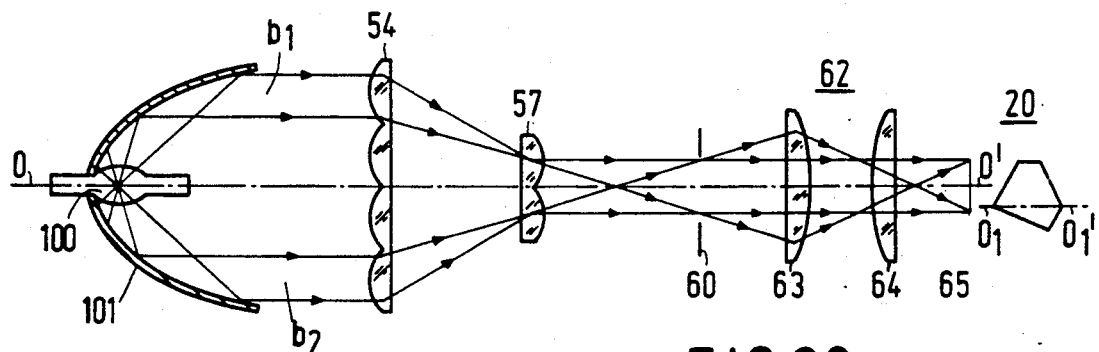
FIG. 20 shows an embodiment of an image projection apparatus with a parabolic reflector in the illumination system.

In the embodiments of the illumination system with condensors described so far all source images formed on the lens plate 57 have the same orientation. FIG. 20 shows a preferred embodiment in which this is no longer the case.

Figure 21:
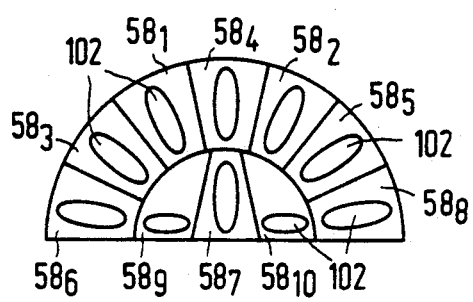
FIG. 21 shows the second lens plate of this apparatus and the light spots formed thereon in a front view.

In this Figure the reference numeral 100 denotes a radiation source in the form of a lamp having an elongate light arc whose longitudinal direction coincides with the first optical axis 00'. A large portion of this lamp is surrounded by a parabolic reflector 101 which reflects the greater part of the radiation emitted by the lamp towards the lens plate 54. The reflector 101 images the radiation source 100 to infinity. The lens plate 54 forms a number of source images, corresponding to the number of lenses 55 in the plate, on the second lens plate 57. Since the different beam portions $b_1$, $b_2$, etc. with which the different images are formed originate from different portions of the reflector 101, all of which portions have a different orientation with respect to the radiation source 100, all of said images have a different orientation with respect to the lens plate 57, as is shown in FIG. 21.

In this Figure, which is a rear view of the lens plate 57, said images are denoted by the reference numeral 102. The lenses are again denoted by the reference numerals $58_1 \ldots 58_{10}$. For most of these lenses the orientation approximately corresponds to that of the source image formed thereon. Consequently, the dimensions of the lenses $58_1 \ldots 58_{10}$ and those of the lens plate 57 can remain limited, which means that the numerical aperture of the projection lens system (C in FIG. 1) can be relatively small.

Figure 22:
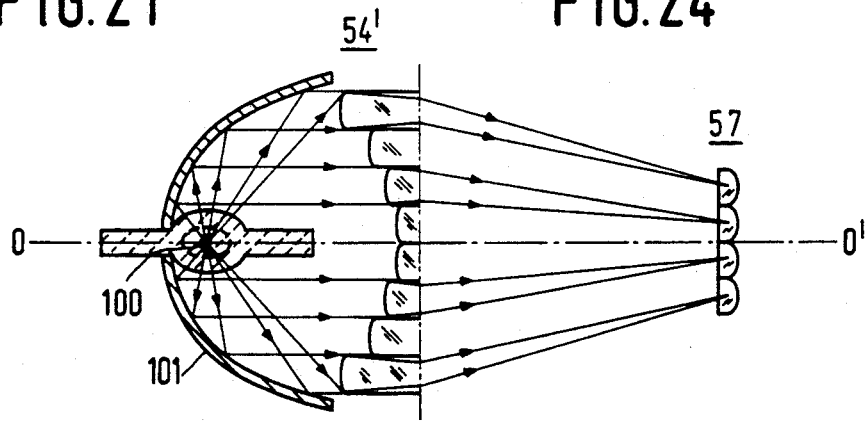
FIG. 22 shows a further embodiment of the illumination system with a parabolic reflector.

FIG. 22 shows an embodiment of an illumination system with a parabolic reflector 101 and a first lens plate 54' with which the intensity distribution on the display panel 1 can be adapted. The lens plate 54' having a curved front face functions in the same way as described with reference to FIG. 20. The combination of a parabolic reflector and the lens plate 54' provides the additional advantage that the numerical aperture of the parabola, which is smaller at the edge, corresponds to that of the lens plate so that a larger efficiency is obtained while the throughput remains the same. Moreover, the illumination system may be given a more compact shape because a portion of the lamp projects into the cavity of the lens plate.

Figure 23:
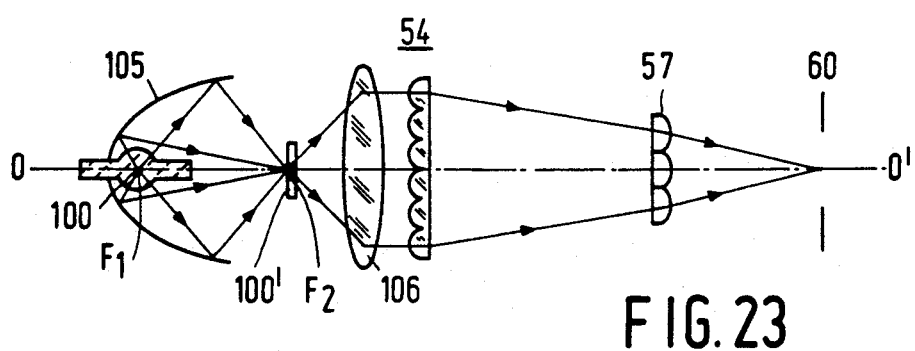

FIG. 23 shows an illumination system of the same type as that of FIG. 20, but in this system the parabolic reflector is replaced by an elliptic reflector 105 and an extral lens 106. The radiation source 100 is, for example, again an elongate lamp whose longitudinal direction coincides with the optical axis 00'. This source is arranged in the first focal point $F_1$ of the elliptic reflector. The reflector forms an image 100' in the second focal point $F_2$. The lens 106 concentrates the radiation from the source 100 and from the image 100' to a parallel beam.

Figure 24:
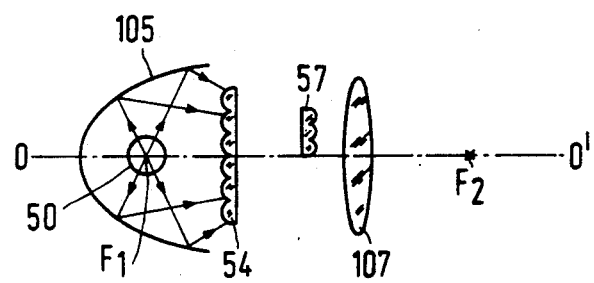
FIGS. 23, 24 and 25 show embodiments of the illumination system with an elliptic reflector.

It is alternatively possible to arrange the first lens plate in the path of the converging beam coming from the reflector 105, as is shown in FIG. 24. A lens 107 to correct for the convergence of the beam incident on the plates is now arranged behind the second lens plate.

Figure 25:
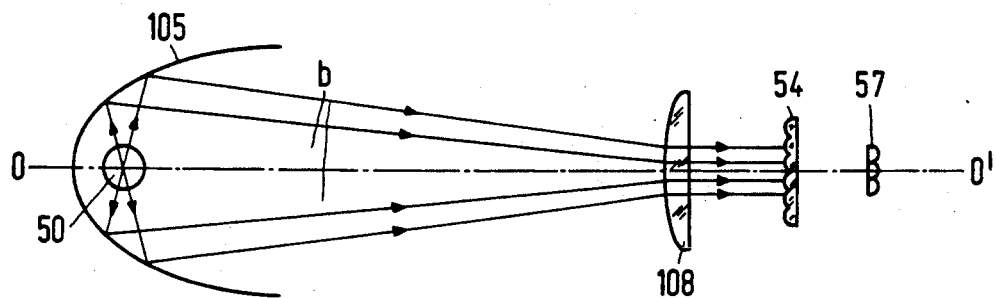

When using an elliptic reflector it may also be ensured that an image of the source is formed on the first lens plate. FIG. 25 shows an embodiment in which this is the case. The lens plates 54, 57 may then have smaller dimensions. A lens 108 rendering the beam b telecentric so that all rays of the beam are perpendicularly incident on the first lens plate 54 may be arranged in front of this lens plate.

Figure 26:
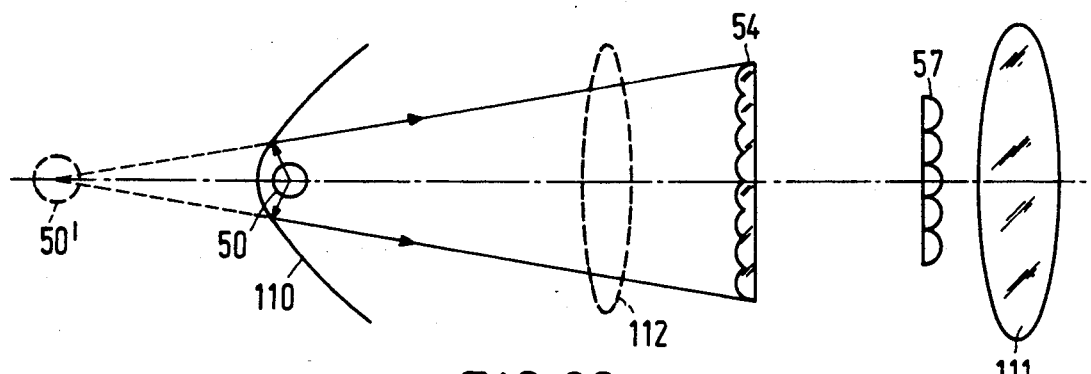
FIG. 26 shows an embodiment of the illumination system with a hyperbolic reflector.

A further embodiment of an illumination system of the same type as that in FIGS. 20 and 23 is shown in FIG. 26. In this embodiment the reflector 110 is hyperbolic. This reflector concentrates the radiation from the source 50 to a diverging beam, which seems to be coming from the virtual source image 50' at the left of the reflector. As is shown in FIG. 26, the first lens plate may be arranged in the path of this diverging beam. A lens 111 to compensate for the divergence of the beam is arranged behind the second lens plate. It is alternatively possible to arrange a lens 112 between the hyperbolic reflector and the first lens plate so as to convert the beam coming from the reflector to a parallel beam.

Figure 27:
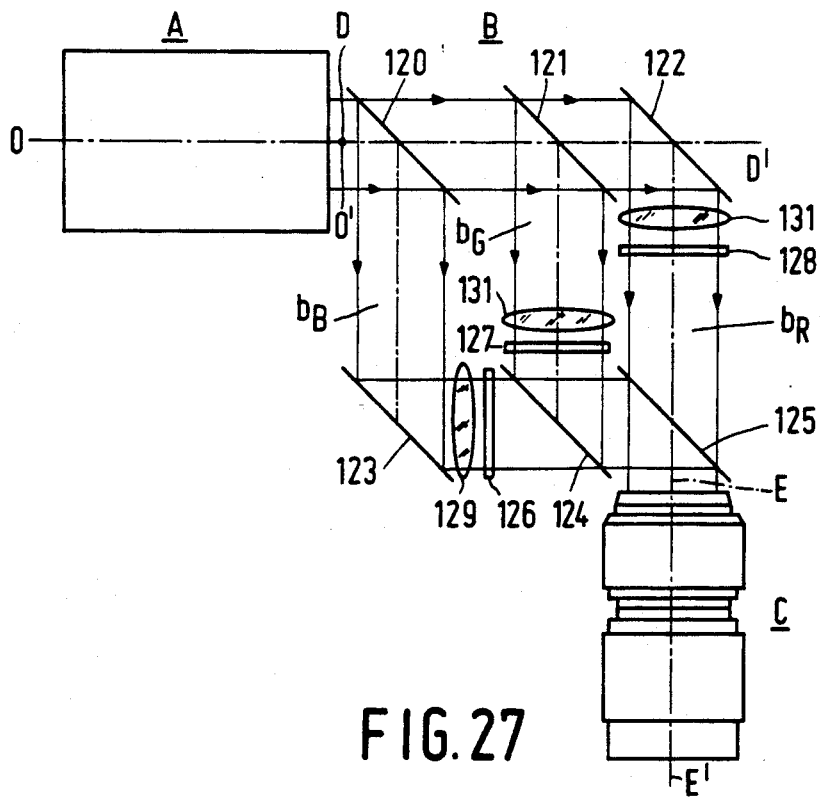
FIG. 27 shows an embodiment of a colour image projection apparatus with one illumination system and transparent display panels.

FIG. 27 shows diagrammatically an embodiment of a colour projection television apparatus. This apparatus comprises three main sections: the illumination system A, the display system B and a projection lens system C, for example, a zoom lens. The principal axis 00' of the illumination system is in alignment with the optical axis DD' of the apparatus, which is firstly divided into three sub-axes in the embodiment shown, which sub-axes are combined at a later stage to one optical axis coinciding with the optical axis EE' of the projection lens system.

The beam from the illumination system A is incident on a colour-selective reflector 120, for example, a dichroic mirror which reflects, for example the blue colour component $b_B$ and passes the rest of the beam. This beam portion reaches a second colour-selective reflector 121 which reflects the green colour component $b_G$ and passes the remaining red colour component $b_R$ to a reflector 122 which reflects the red beam to the projection lens system. The reflector 122 may be a neutral or a reflector which is optimized for red light. The blue beam is reflected by a neutral or blue-selective reflector 123 to a display panel 126 in the form of a liquid crystalline panel. This panel is electronically driven in known manner so that the blue component of the image to be projected appears on this panel. The beam modulated with the blue information reaches the projection lens system C via a colour-selective reflector 124, which passes the blue beam and reflects the green beam, and a further colour-selective reflector 125 which reflects the blue beam. The green beam $b_G$ traverses a second display panel 127 where it is modulated with the green colour component and is then reflected to the projection lens system C successively by the colour-selective reflectors 124 and 125. The red beam $b_R$ traverses a third display panel 128 where it is modulated with the red colour component and subsequently it reaches the projection lens system via the colour-selective reflector 125.

The blue, red and green beams are superimposed at the input of this lens system so that a colour image is created at this input which is imaged in a magnified form by this system on a projection screen, which is not shown in FIG. 27.

The optical path lengths between the output of the illumination system A and each display panel 126, 127 and 128 are preferably equal so that the cross-sections of the beams $b_B$, $b_G$ and $b_R$ are equal at the location of their display panel. Also the optical path lengths between the display panels 126, 127 and 128 and the input aperture of the projection lens system are preferably equal so that the differently coloured scenes are satisfactorily superimposed on the projection screen.

Each lens 129, 130 and 131 arranged in front of the display panels 126, 127 and 128 corresponds to the lens 73 of FIG. 10 and ensures that all radiation coming from the exit plane of the illumination system is concentrated in the entrance pupil of the projection lens system C.

Figure 28:
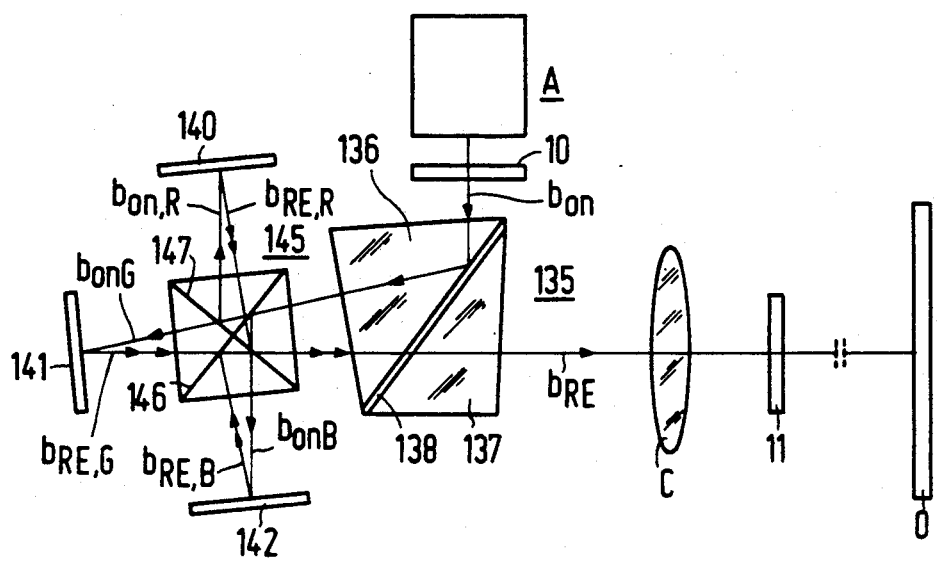
FIG. 28 shows an embodiment of a colour image projection apparatus with one illumination system and reflecting display panels.

FIG. 28 shows an embodiment of a colour image projection apparatus with reflecting display panels 140, 141 and 142. The beam b supplied by the illumination system according to the invention is split into three differently coloured beams $b_R$, $b_G$ and $b_B$ by a so-called dichroic cross 145 constituted by two dichroic mirrors 146 and 147.

The projection lens system C, illustrated by a single lens in this Figure, should only collect radiation of the beam $b_{RE}$ reflected by the display panels and no radiation of the beam $b_{ON}$ supplied by the illumination system.

In order to ensure that the beams $b_{ON}$ and $b_{RE}$ are sufficiently separated at the position of the projection lens system without the distance between this system and the display panel having to be large, use is made of an angle-dependent beam separator in the form of a composite system of prisms 135. This system comprises two transparent prisms 136 and 137 of glass or a synthetic material between which a layer of air 138 is present. Since the refractive index $n_m$ of the prism material ($n_m$ is, for example, 1.5) is larger than the index $n_l$ of air ($n_l = 1.0$), a radiation beam which is incident on the interface between the prism and air at an angle $\theta_i$ which is larger than or equal to the so-called critical angle $\theta_g$ for which it holds that $$\sin\theta_g = \frac{n_l}{n_m}$$

will be totally reflected. The beam which is incident on the interface at an angle which is smaller than the critical angle is completely transmitted. In the embodiment according to FIG. 28 the refractive index of the prisms 136 and 137 and the orientation of the air layer 138 are chosen to be such that the beam $b_{ON}$ coming from the illumination system A is totally reflected by the interface 136, 138 towards the display system and that the beam $b_{RE}$ coming from this system is completely passed by this interface. For this purpose the angle of incidence of the beam $b_{ON}$ and the beam $b_{RE}$ on the interface is larger and smaller, respectively, than the critical angle.

The system of prism ensures that the chief ray of the beam $b_{RE}$ extends at a large angle, which may be proximate to 90°, to that of the beam $b_{ON}$. Consequently, the projection lens system C can be arranged close to the display system so that the length of the image projection apparatus can be considerably shorter than in the absence of the system of prisms.

It is also possible to choose the orientation of the interface 136, 138 with respect to the directions of the beams $b_{ON}$ and $b_{RE}$ in such a way that the beam $b_{ON}$ is passed on to the display system, which is then arranged below the system of prisms, and that the beam $b_{RE}$ is reflected to the projection lens system C. In the case of colour beam projection the latter arrangement provides the advantage that fewer colour aberrations occur in the modulated beam $b_{RE}$.

In FIG. 28 the beam $b_{ON}$ reflected by the interface 136, 138 is incident on a first dichroic mirror 146 which reflects, for example blue light. The blue component $b_{ON,B}$ is incident on the display panel 142 in which the blue sub-image is generated and the beam $b_{RE,B}$ modulated with the blue image information is reflected to the dichroic cross 145 by the panel 142. The beam having a red and a green component passed by the dichroic mirror 146 is incident on the second dichroic mirror 147 which reflects the red component $b_{ON,R}$ to the display panel 140. the red sub-image is generated in this panel. The beam $b_{RE,R}$ modulated with the red image information is reflected to the dichroic cross 145. The green beam component $b_{ON,G}$ passed by the mirror 147 is modulated by the green display panel 141 and reflected as beam component $b_{RE,G}$ to the dichroic cross 145. Since the dichroic mirrors 146 and 147 reflect the returning beam components $b_{RE,B}$ and $b_{RE,R}$ and pass the beam component $B_{RE,G}$, these beam components are combined to one beam $b_{RE}$ which is modulated with the colour image information.

The polarizer 10 and the analyser 11 are preferably arranged between the illumination system A and the display system, and between the display system and the projection lens system, respectively, so that these elements simultaneously act on the three colour components and a separate system of such elements is not necessary for each colour component.

A directly driven reflective liquid crystal display panel is described in, inter alia, U.S. Pat. No. 4,239,346.

Instead of the composite prism 135, a polarization-sensitive beam splitter may alternatively be used in a colour image projection apparatus in which the beams may be perpendicularly incident on the display panels. The polarization-sensitive beam splitter ensures that only light having a specific direction of polarization is reflected or passed to a display panel and that only the component of the light reflected by the panel with a direction of polarization perpendicular to the direction of polarization of the incident beam is passed or reflected to the projection lens system. The polarization-sensitive beam splitter then also functions as a converter of polarization modulation to intensity modulation.

The colour image projection apparatus may alternatively comprise a display system having only one display panel instead of three monochrome panels, namely a composite or colour panel. This colour panel then comprises a number of pixels which is, for example, three times as large as the number of pixels of a monochrome panel. The pixels of the colour panel are arranged in three groups with which a red, a green and a blue sub-image is generated. A pixel of each group is conjugated to a pixel on the projection screen. A separate colour filter is then arranged, for example in front of each pixel, which filter only passes the colour desired for the relevant pixel.

The colour panel may be a transmission panel in which the colour image projection apparatus may have a construction as is shown in FIGS. 6, 11 and 20. If the colour panel is a reflective panel, the colour image projection apparatus may have a construction as is shown, for example in FIG. 28 in which the colour panel is arranged at the position of the monochrome panel 141 and the panels 140 and 142 as well as the dichroic cross 145 have been omitted.

Figure 29:
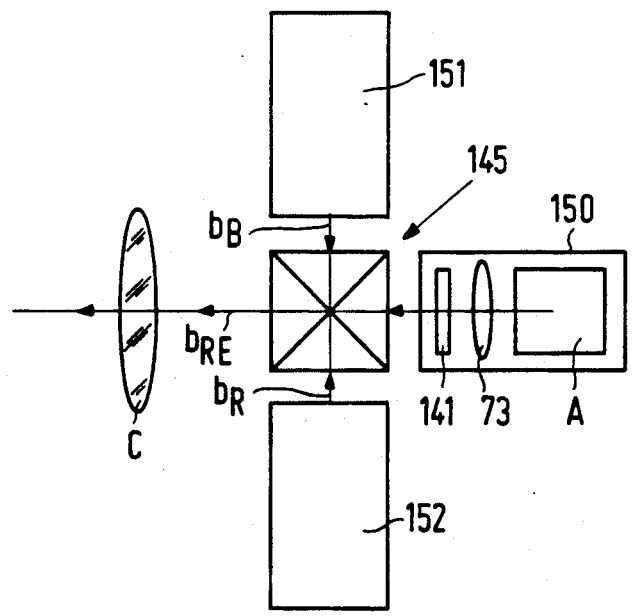
FIG. 29 shows a colour image projection apparatus with a separate illumination system for each colour channel.

FIG. 29 is a diagrammatic plan view of a colour image projection apparatus using three colour channels 150, 151 and 152 for the primary colours green, blue and red, respectively. Each colour channel comprises an illumination system A according to the invention, a lens 73 and a transmission display panel 141. These elements are shown in the green channel 150. Corresponding elements are arranged in the same manner in the other channels. The differently coloured beams $b_G$, $b_B$ and $b_R$ modulated with the image information are combined to one beam $b_{RE}$ by, for example a dichroic cross 145, which beam is projected on a display screen (not shown) by the projection lens system C.

The illumination system according to the invention may not only be used for illuminating a liquid crystal display panel, but also for illuminating a display system using a cathode ray tube in combination with a photoconducting layer and a layer of liquid crystalline material, which display system is described in U.S. Pat. No. 4,127,322.

The invention may generally be used in those cases where a non-round object must be illuminated with light of a specific state of polarization and where very efficient use should be made of the radiation supplied by a radiation source.

The image projection apparatus shown in FIGS. 6 and 11 is adapted in such a way that the beam $b'$ has a semi-circular cross-section in a plane located behind the axial area reserved for the beam splitter 20. However, the apparatus may alternatively be adapted in such a way that the beam $b'$ has such a semi-circular cross-section at the location of the entrance plane of the beam splitter. For the purpose of a better comparison, FIG. 30 shows the image projection apparatus in accordance with the principle of FIGS. 6 and 11, while FIG. 31 shows the last-mentioned possibility.

The two Figures show how the border rays I and II, and III and IV, respectively, of the sub-beams coming from the two outer lenses of the lens plate 52 traverse the system consisting of the second lens plate 54, the beam splitter 20, the lenses 67' and 73 and the display panel 1 and are ultimately incident on the entrance pupil Ip of the projection lens system C. As described hereinbefore, the beam splitter 20 splits each ray I, II, III and IV into two rays $I_A$, $I_B$; $II_A$, $II_B$; $III_A$, $III_B$ and $IV_A$, $IV_B$, respectively. The lens system 73 combines the rays at four points located at both sides of the optical axis.

Figure 30:
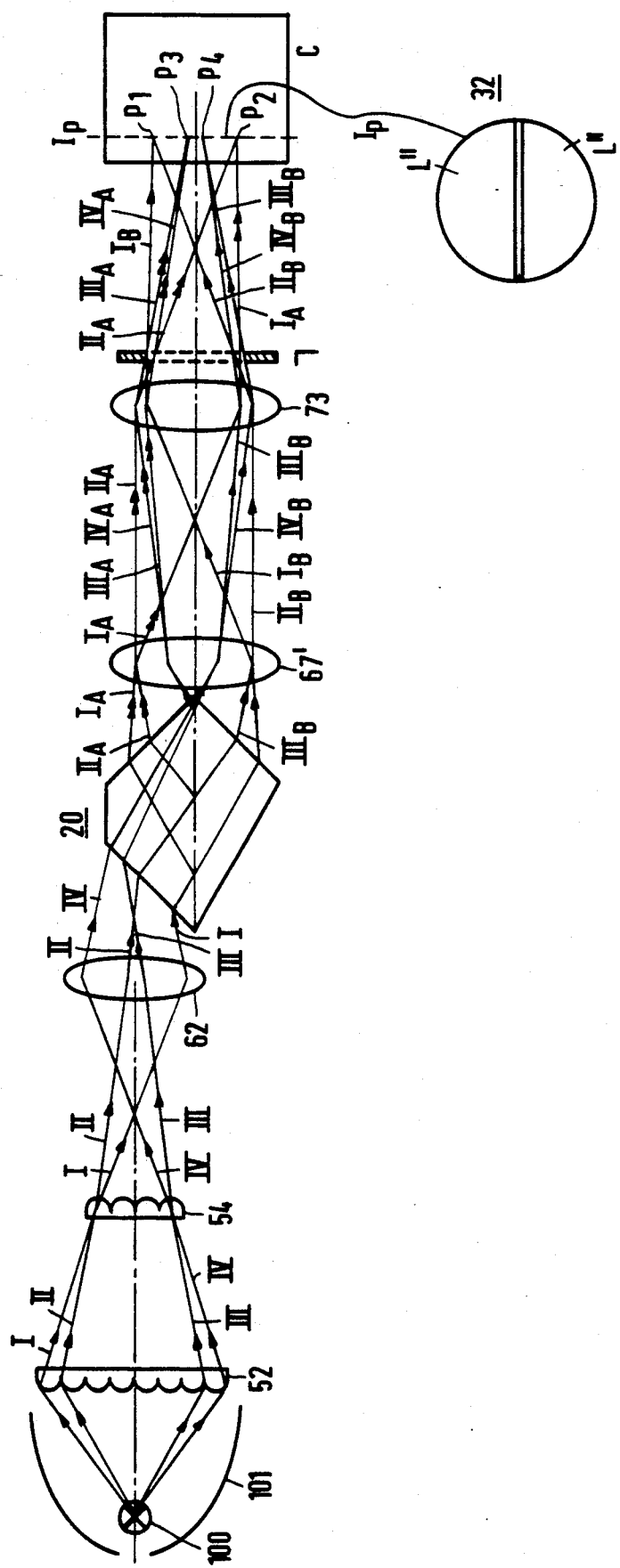
FIGS. 30 and 31 show embodiments of the image projection apparatus with and without a lens system, respectively, between the second lens plate and the beam splitter.

In FIG. 30 a lens system 62 is arranged between the second lens plate 54 and the beam splitter 20, which lens system forms a semi-circular image of the radiation source directly behind the beam splitter 20. The lens system 73 combines the rays $I_B$ and $II_B$ at a first point $P_1$ and the rays $I_A$ and $II_A$ at a second point $P_2$, which points are located diametrically with respect to the optical axis and at some distance therefrom. The rays III$_A$ and IV$_A$ are combined at a third point P$_3$ and the rays III$_B$ and IV$_B$ are combined at a fourth point P$_4$, which points P$_3$ and P$_4$ are located close to the optical axis. The source image formed in the entrance pupil of the projection lens system C consists of two semi-circular radiation spots L'' which are located close together and jointly constitute substantially one round spot 32, as is shown at the bottom right in FIG. 30.

Figure 31:
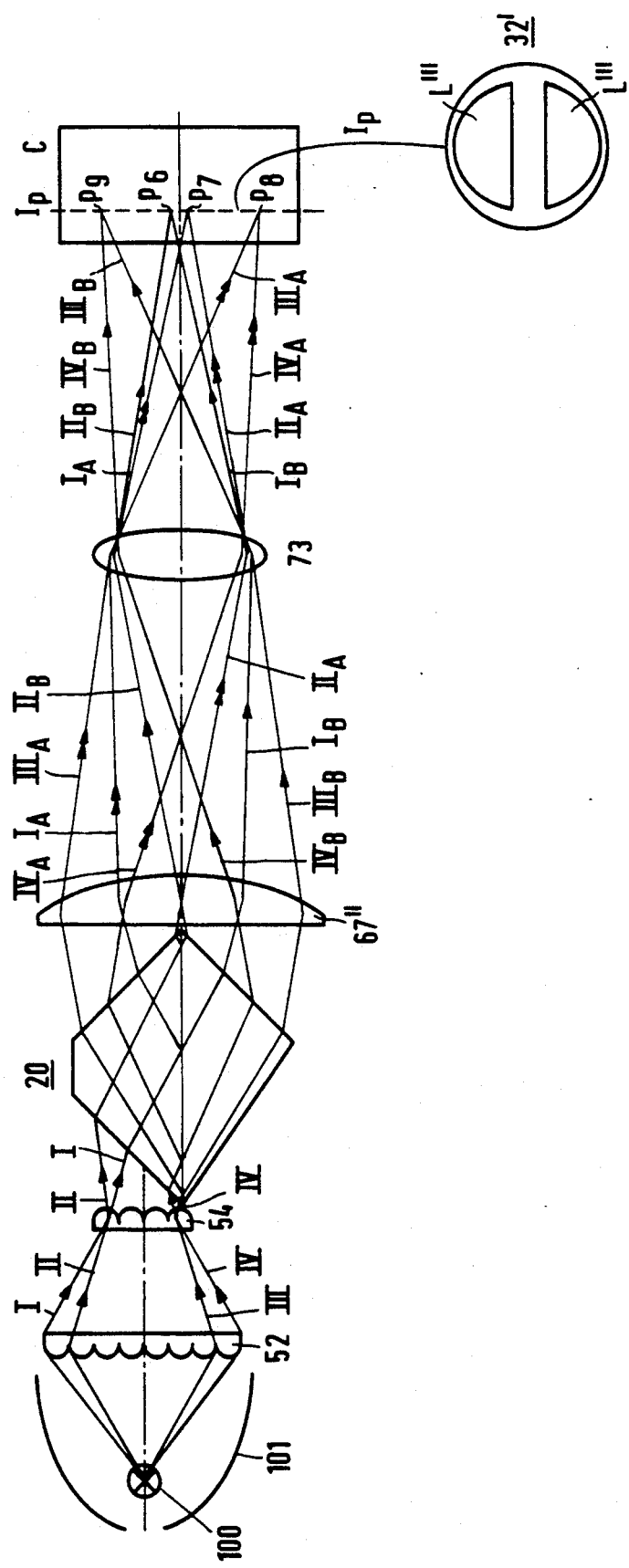

In the embodiment shown in FIG. 31 the lens system 62 is absent and the beam splitter 20 is arranged directly behind the second lens plate 54. As a result, the border rays I and II, and III and IV, respectively, of the beams coming from the outer lenses of the lens plate 52 traverse paths which are different to those in FIG. 30. The lens system 73 now combines the rays I$_B$ and II$_B$ at a point P$_6$, the rays I$_A$ and II$_A$ at a point P$_7$, the rays III$_A$ and IV$_A$ at a point P$_8$ and the rays III$_B$ and IV$_B$ at a point P$_9$. The source image in the pupil I$_p$ of the projection lens system C again consists of two semi-circular radiation spots L''' which are, however, located at a greater distance from each other and from the optical axis so that the projection lens system C should have a larger aperture 32', or a lower F number, than in the embodiments shown in FIGS. 6, 11 and 30. This drawback is outweighted by the advantage that a smaller number of elements is required and that the overall length of the system is smaller.

We claim:

1. An image projection apparatus comprising an illumination system, an image display system having at least one display panel for generating an image to be projected, in which the direction of polarization of an illumination beam supplied by the illumination system is modulated with the image information, a projection lens system for projecting the image formed by the image display system on a projection screen and a polarization-sensitive beam splitter arranged between the illumination system and the image display system for splitting the illumination beam into two differently polarized sub-beams the first of which is directly suitable to be modulated by the image display system and a polarization-rotating element for converting the second sub-beam into a beam having the same state of polarization as the first sub-beam, said first and second sub-beams being incident on the image display system, characterized in that the polarization-sensitive beam splitter comprises an oriented layer of birefringent material, in that the illumination beam directed towards the beam splitter has a semi-circular cross-section in a plane proximate to the beam splitter, in that the sub-beams traverse the same optical path length through the beam splitter and in that the sub-beams exiting from the combination of beam splitter and polarization-rotating element have a semi-circular cross-section and both fit within a circle.

2. An image projection apparatus as claimed in claim 1, characterized in that the beam splitter comprises a first prism having a first face which is parallel to the chief ray of the illumination beam incident on the beam splitter and a second prism having a first face which is parallel to the chief ray, which prisms have the same refractive index, in that the layer of birefringent material is located between the first faces of the prisms, while one of the refractive indices of said material is substantially equal to that of the prisms, in that a second and a third face of the first prism, which faces extend at equally large but opposite angles to the first face, constitute the entrance face and a first exit face, respectively, of the beam splitter, and in that a second face of the second prism, which face is parallel to the second face of the first prism, constitutes a second exit face of the beam splitter.

3. An image projection apparatus as claimed in claim 2, in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

4. An image projection apparatus as claimed in claim 2, characterized in that the polarization-rotating element is arranged on one of the exit faces of the beam splitter.

5. An image projection apparatus as claimed in claim 4, characterized in that the birefringent material is a liquid crystalline material.

6. An image projection apparatus as claimed in claim 4, characterized in that the layer of birefringent material is a birefringent adhesive layer.

7. An image projection apparatus as claimed in claim 4, in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

8. An image projection apparatus as claimed in claim 2, characterized in that the birefringent material is a liquid crystalline material.

9. An image projection apparatus as claimed in claim 8 in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

10. An image projection apparatus as claimed in claim 2 or 4, characterized in that the layer of birefringent material is a birefringent adhesive layer.

11. An image projection apparatus as claimed in claim 10 in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

12. An image projection apparatus as claimed in claim 10, characterized in that the adhesive layer is a uniaxially oriented polymer layer.

13. An image projection apparatus as claimed in claim 12, in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

14. An image projection apparatus as claimed in claim 12, characterized in that the polymer layer is formed from a cured liquid crystalline monomer composition.

15. An image projection apparatus as claimed in claim 14, in which the illumination system comprises a radiation source, a concave reflector for concentrating light from the source and a lens system arranged in the path of the concentrated light, characterized in that the lens system successively comprises a first lens plate provided with a plurality of first lenses which in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

16. An image projection apparatus as claimed in claim 1, characterized in that the beam splitter comprises a layer of cholesteric material arranged at an angle of approximately 45° to the principal axis, which layer splits the illumination beam into a first, reflected sub-beam of circularly polarized light having a first direction of rotation and into a second, on-going sub-beam of circularly polarized light having a second, opposite direction of rotation, and is further provided with a first reflector arranged in the path of the first sub-beam and being parallel to the chief ray of the illumination beam incident on the beam splitter, and with a second reflector arranged in the path of the second sub-beam at an angle of approximately 90° to the cholesteric layer, and in that one of the reflectors reverses the direction of rotation of the sub-beam incident thereon.

17. An image projection apparatus as claimed in claim 16, in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

18. An image projection apparatus as claimed in claim 1, in which the illumination system comprises a radiation source, a concave reflector for concentrating light from the source and a lens system arranged in the path of the concentrated light, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses, and a third lens, the first lens plate dividing a radiation beam incident thereon into a number of sub-beams proportional to the number of second lenses, which sub-beams have their smallest constriction in the plane of the second lenses and whose chief rays are directed towards the centers of the second lenses, the second lenses imaging the radiation spots formed on the first lens plate in a superimposed form in an intermediate image and the third lens forming an image of the second lens plate in a plane proximate to the exit face of the beam splitter, in that the width/height ratio of the first lenses corresponds to that of a display panel and in that the second lenses are arranged within a half circle.

19. An image projection apparatus as claimed in claim 18, characterized in that at least one of the lenses of at least one of the lens plates is aspherical.

20. An image projection apparatus as claimed in claim 19, characterized in that the number of first lenses is equal to the number of second lenses.

21. An image projection apparatus as claimed in claim 19, characterized in that the first lenses have such a size and are arranged in such a way that the surface of the first lens plate is approximately equal to the cross-section of the illumination beam incident thereon.

22. An image projection apparatus as claimed in claim 19, characterized in that the first lens plate is arranged in a plane in which a first image of the light source is formed and in that said image is reimaged in an intermediate image by the second lens plate.

23. An image projection apparatus as claimed in claim 19, characterized in that a reduced image of the light source is formed on each one of the second lenses.

24. An image projection apparatus as claimed in claim 19, characterized in that the first lens plate, together with an associated lens, is integrated in one optical element having at least one curved surface.

25. An image projection apparatus as claimed in claim 18, characterized in that the number of first lenses is equal to the number of second lenses.

26. An image projection apparatus as claimed in claim 25, characterized in that the first lenses have such a size and are arranged in such a way that the surface of the first lens plate is approximately equal to the cross-section of the illumination beam incident thereon.

27. An image projection apparatus as claimed in claim 25, characterized in that the first lens plate is arranged in a plane in which a first image of the light source is formed and in that said image is reimaged in an intermediate image by the second lens plate.

28. An image projection apparatus as claimed in claim 25, characterized in that a reduced image of the light source is formed on each one of the second lenses.

29. An image projection apparatus as claimed in claim 25, characterized in that the first lens plate, together with an associated lens, is integrated in one optical element having at least one curved surface.

30. An image projection apparatus as claimed in claim 18, characterized in that the first lenses have such a size and are arranged in such a way that the surface of the first lens plate is approximately equal to the cross-section of the illumination beam incident thereon.

31. An image projection apparatus as claimed in claim 30, characterized in that the first lens plate is arranged in a plane in which a first image of the light source is formed and in that said image is reimaged in an intermediate image by the second lens plate.

32. An image projection apparatus as claimed in claim 30, characterized in that a reduced image of the light source is formed on each one of the second lenses.

33. An image projection apparatus as claimed in claim 30, characterized in that the first lens plate, together with an associated lens, is integrated in one optical element having at least one curved surface.

34. An image projection apparatus as claimed in claim 18, characterized in that the first lens plate is arranged in a plane in which a first image of the light source is formed and in that said image is reimaged in an intermediate image by the second lens plate.

35. An image projection apparatus as claimed in claim 34, characterized in that the first lens plate, together with an associated lens, is integrated in one optical element having at least one curved surface.

36. An image projection apparatus as claimed in claim 18, characterized in that a reduced image of the light source is formed on each one of the second lenses.

37. An image projection apparatus as claimed in claim 36, characterized in that the first lens plate, together with an associated lens, is integrated in one optical element having at least one curved surface.

38. An image projection apparatus as claimed in claim 18, characterized in that the first lens plate, together with an associated lens, is integrated in one optical element having at least one curved surface.

39. An image projection apparatus as claimed in claim 38 in which the associated lens is planoconvex, characterized in that the first lenses are arranged on the flat refractive surface of the lens.

40. An image projection apparatus as claimed in claim 38, characterized in that the first lenses are arranged on a curved refractive surface of the lens.

41. An image projection apparatus as claimed in claim 38, characterized in that a curved refractive surface of the lens is replaced by a principally flat surface on which the first lenses are arranged each having a curvature which is related to the curvature, at the location of the relevant lens, of the original curved refractive surface.

42. An image projection apparatus as claimed in claim 18, characterized in that the reflector is a spherical reflector which only collects light emitted by the source at one side of the plane through the centre of the radiation source and perpendicular to the optical axis of the system, and in that a condensor lens system is arranged at the other side of said plane and in front of the first lens plate.

43. An image projection apparatus as claimed in claim 42, characterized in that each condensor lens system comprises at least one lens, at least one refractive surface of which is aspherical.

44. An image projection apparatus as claimed in claim 43, characterized in that the first lens plate is divided into two first plates which are arranged in the first and the second condensor lens system, respectively.

45. An image projection apparatus as claimed in claim 42, characterized in that each condensor lens system comprises a main condensor lens which is succeeded by at least one extra lens element.

46. An image projection apparatus as claimed in claim 45, characterized in that the first lens plate is divided into two first plates which are arranged in the first and the second condensor lens system, respectively.

47. An image projection apparatus as claimed in claim 18, characterized in that the reflector is a spherical reflector which only collects light emitted by the source at one side of the plane through the centre of the radiation source and perpendicular to optical axis of the system, and in that two condensor lens systems are arranged at the other side of said plane and in front of the first lens plate, each system capturing a different part of the light originating from the source and the reflector.

48. An image projection apparatus as claimed in claim 47, characterized in that each condensor lens system comprises at least one lens, at least one refractive surface of which is asperical.

49. An image projection apparatus as claimed in claim 47, characterized in that each condensor lens system comprises a main condensor lens which is succeeded by at least one extra lens element.

50. An image projection apparatus as claimed in claim 47, characterized in that the first lens plate is divided into two first plates which are arranged in the first and the second condensor lens system, respectively.

51. An image projection apparatus as claimed in claim 18, characterized in that the reflector is a parabolic reflector which surrounds the greater part of the light source.

52. An image projection apparatus as claimed in claim 51, in which the radiation source is elongate, characterized in that the longitudinal direction of the source is parallel to the principal axis.

53. An image projection apparatus as claimed in claim 18, characterized in that the reflector is an elliptic reflector which surrounds the greater part of the light source.

54. An image projection apparatus as claimed in claim 53, in which the radiation source is elongate, characterized in that the longitudinal direction of the source is parallel to the principal axis.

55. An image projection apparatus as claimed in claim 53, characterized in that a collimator lens is arranged between the reflector and the first lens plate.

56. An image projection apparatus as claimed in claim 55, in which the radiation source is elongate, characterized in that the longitudinal direction of the source is parallel to the principal axis.

57. An image projection apparatus as claimed in claim 18, characterized in that the reflector is a hyperbolic reflector.

58. An image projection apparatus as claimed in claim 57, in which the radiation source is elongate, characterized in that the longitudinal direction of the source is parallel to the principal axis.

59. An image projection apparatus as claimed in claim 57, characterized in that a collimator lens is arranged between the reflector and the first lens plate.

60. An image projection apparatus as claimed in claim 59, in which the radiation source is elongate, characterized in that the longitudinal direction of the source is parallel to the principal axis.

61. A colour image projection apparatus having three colour channels for the three primary colours red, green and blue, each colour channel comprising a separate display panel, characterized in that it comprises one image projection apparatus as claimed in claim 1 for supplying separate beams for the three colour channels via colour-splitting means.

62. A colour image projection apparatus having three colour channels for the three primary colours red, green and blue, each channel comprising a separate display panel, characterized in that each colour channel comprises a separate image projection apparatus as claimed in claim 1.

* * * * *